US012663604B2

(12) United States Patent
Shi et al.

(10) Patent No.: US 12,663,604 B2
(45) Date of Patent: Jun. 23, 2026

(54) OPTICAL LENS ASSEMBLY

(71) Applicant: Zhejiang Sunny Optics Co., Ltd, Yuyao City (CN)

(72) Inventors: Xianchao Shi, Yuyao City (CN); Qian Li, Yuyao City (CN); Fang Zhang, Yuyao City (CN); Fujian Dai, Yuyao City (CN); Liefeng Zhao, Yuyao City (CN)

(73) Assignee: ZHEJIANG SUNNY OPTICS CO., LTD, Yuyao City (CN)

( * ) Notice: Subject to any disclaimer, the term of this patent is extended or adjusted under 35 U.S.C. 154(b) by 504 days.

(21) Appl. No.: 18/308,641

(22) Filed: Apr. 27, 2023

(65) Prior Publication Data
US 2024/0241338 A1 Jul. 18, 2024

(30) Foreign Application Priority Data

Jan. 12, 2023 (CN) .......................... 202310094520.2

(51) Int. Cl.
*G02B 13/00* (2006.01)
*G02B 7/02* (2021.01)
*G02B 9/62* (2006.01)

(52) U.S. Cl.
CPC ............... *G02B 7/021* (2013.01); *G02B 9/62* (2013.01); *G02B 13/0045* (2013.01)

(58) Field of Classification Search
CPC ......... G02B 7/021; G02B 9/62; G02B 13/004
See application file for complete search history.

(56) References Cited

U.S. PATENT DOCUMENTS

2025/0060564 A1* 2/2025 Jung ...................... G02B 13/00

FOREIGN PATENT DOCUMENTS

CN     102621664 A     8/2012
CN     109739012 A     5/2019
CN     217085379 U     7/2022

OTHER PUBLICATIONS

Indian Office Action corresponding to application 202314086776, dated Mar. 3, 2026, 10 pages.

* cited by examiner

*Primary Examiner* — Wen Huang
(74) *Attorney, Agent, or Firm* — Reising Ethington P.C.

(57) ABSTRACT

An optical lens assembly. The optical lens assembly comprises a lens barrel, and first to sixth lenses. The refractive power of the fifth lens and the refractive power of the sixth lens are positive-negative opposite, and an image-side surface of the fifth lens is a convex surface. The lens barrel further comprises a fourth spacer and a fifth spacer, the fourth spacer being disposed between the fourth lens and the fifth lens, and the fifth spacer being disposed between the fifth lens and the sixth lens. An axial distance EP45 from an image-side surface of the fourth spacer to an object-side surface of the fifth spacer, a center thickness CT5 of the fifth lens, an effective focal length f5 of the fifth lens, an effective focal length f6 of the sixth lens and a radius of curvature R10 of the image-side surface of the fifth lens satisfy: $-0.5 < EP45/CT5 \cdot |f5+f6|/R10 < 0$.

18 Claims, 12 Drawing Sheets

Longitudinal aberration curve (mm)

Lateral color curve (μm)

Longitudinal aberration curve

Astigmatic Curve

Distortion curve

Lateral color curve

OPTICAL LENS ASSEMBLY

CROSS-REFERENCE TO RELATED APPLICATIONS

This application claims benefit of priority to Chinese Patent Application No. 202310094520.2 filed on Jan. 12, 2023 before the China National Intellectual Property Administration, the entire disclosure of which is incorporated herein by reference in its entity.

TECHNICAL FIELD

The present disclosure relates to the technical field of optical imaging device, and specifically to an optical lens assembly.

BACKGROUND

With the continuous development of science and technology and the continuous improvement in quality of life, one's requirements for electronic products are diversified. Particularly, in the field of mobile phones, with increasing requirements on the camera quality of mobile phones, a single optical lens assembly can no longer satisfy the demands of users. Currently, a smart phone device is equipped with a plurality of optical lens assemblies to satisfy the users in different usage environments. With the advantages of an optical system, a telephoto optical lens assembly can take a clear picture from a long distance, and can still keep an imaging picture clear after magnifying the imaging picture many times. However, due to the characteristics of a telephoto lens assembly, the telephoto lens assembly currently on the market uses a large number of lenses, usually six lenses or seven lenses. Taking a telephoto lens assembly having six lenses as an example, a traditional telephoto lens assembly having six lenses will have a large segment difference during assembling. The large segment difference makes the lenses assembled unstably during assembling. Moreover, due to the large segment difference, it is easy to generate diffracted stray light at a position where the spacing distance is large, and at the same time, it is easy to cause a problem of assembling credibility.

That is to say, the optical lens assembly in the prior art has the problems of diffracted stray light and assembling credibility.

SUMMARY

The main purpose of the present disclosure is to provide an optical lens assembly to solve the problems of diffracted stray light and assembling credibility of the optical lens assembly in the prior art.

To realize the above purpose, according to an aspect of the present disclosure, an embodiment of the present disclosure provides an optical lens assembly. The optical lens assembly includes a lens barrel, and a first lens, a second lens, a third lens, a fourth lens, a fifth lens and a sixth lens that are sequentially disposed in the lens barrel from an object side to an image side; where a refractive power of the fifth lens and a refractive power of the sixth lens are positive-negative opposite, and an image-side surface of the fifth lens is a convex surface; the lens barrel further comprises a plurality of spacers, and the plurality of spacers at least comprise a fourth spacer and a fifth spacer, the fourth spacer being disposed between the fourth lens and the fifth lens and being in contact with an image-side surface of the fourth lens, and the fifth spacer being disposed between the fifth lens and the sixth lens and being in contact with the image-side surface of the fifth lens and an image-side surface of the sixth lens respectively; and an axial distance EP45 from an image-side surface of the fourth spacer to an object-side surface of the fifth spacer, a center thickness CT5 of the fifth lens, an effective focal length f5 of the fifth lens, an effective focal length f6 of the sixth lens, and a radius of curvature R10 of the image-side surface of the fifth lens satisfy: $-0.5 < EP45/CT5*|f5+f6|/R10 < 0$.

In an implementation of the embodiment, the an effective focal length f of the optical lens assembly, an inner diameter d0m of an image-side surface of the lens barrel, and an axial distance TD from an object-side surface of the first lens to the image-side surface of the sixth lens satisfy: $1 < f*f/(d0m*TD) < 2.5$.

In an implementation of the embodiment, the plurality of spacers further comprise a first spacer, a second spacer, and a third spacer, the first spacer is disposed between the first lens and the second lens and is in contact with an image-side surface of the first lens, the second spacer is disposed between the second lens and the third lens and is in contact with an image-side surface of the second lens, the third spacer is disposed between the third lens and the fourth lens and is in contact with an image-side surface of the third lens, where an axial distance EP12 from an image-side surface of the first spacer to an object-side surface of the second spacer and an axial distance EP23 from an image-side surface of the second spacer to an object-side surface of the third spacer satisfy: $EP12 > EP23$.

In an implementation of the embodiment, an effective focal length f2 of the second lens, the axial distance EP12 from the image-side surface of the first spacer to the object-side surface of the second spacer, and the axial distance EP23 from the image-side surface of the second spacer to the object-side surface of the third spacer satisfy: $-100 < f2/(EP12-EP23) < -10$.

In an implementation of the embodiment, a radius of curvature R4 of the image-side surface of the second lens, a radius of curvature R1 of an object-side surface of the first lens, the axial distance EP12 from the image-side surface of the first spacer to the object-side surface of the second spacer, and a center thickness CT2 of the second lens satisfy: $3 < (R4-R1)/(EP12-CT2) < 50$.

In an implementation of the embodiment, the axial distance EP45 from the image-side surface of the fourth spacer to the object-side surface of the fifth spacer, an axial distance TD from an object-side surface of the first lens to the image-side surface of the sixth lens, the radius of curvature R10 of the image-side surface of the fifth lens, a radius of curvature R9 of an object-side surface of the fifth lens, and an effective focal length f of the optical lens assembly satisfy: $-2 < EP45/TD*(R10-R9)/f < 0$.

In an implementation of the embodiment, a combined focal length f1234 of the first lens, the second lens, the third lens, and the fourth lens, an axial distance EP01 from an object-side surface of the lens barrel to an object-side surface of the first spacer, the axial distance EP12 from the image-side surface of the first spacer to the object-side surface of the second spacer, the axial distance EP23 from the image-side surface of the second spacer to the object-side surface of the third spacer, and an axial distance EP34 from an image-side surface of the third spacer to an object-side surface of the fourth spacer satisfy:

$$2 < f1234/(EP01 + EP12 + EP23 + EP34) < 5.$$

In an implementation of the embodiment, a radius of curvature R1 of an object-side surface of the first lens, a maximal thickness CP1 of the first spacer, and an axial distance EP01 from an object-side surface of the lens barrel to an object-side surface of the first spacer satisfy: $1 < R1/(CP1+EP01) < 2$.

In an implementation of the embodiment, an inner diameter dos of an object-side surface of the lens barrel, an inner diameter d1s of an object-side surface of the first spacer, a center thickness CT1 of the first lens, and an F-number Fno of the optical lens assembly satisfy: $4 < (d0s-d1s)/CT1*Fno < 12$.

In an implementation of the embodiment, an inner diameter d1s of an object-side surface of the first spacer, a center thickness CT1 of the first lens, an effective focal length f1 of the first lens, and a radius of curvature R1 of an object-side surface of the first lens satisfy:

$$4 < d1s/CT1^* f1/R1 < 8.$$

In an implementation of the embodiment, an effective focal length f of the optical lens assembly, an inner diameter d0m of an image-side surface of the lens barrel, and an outer diameter D0s of an object-side surface of the lens barrel satisfy: $f/|d0m-D0s| > 4$.

In an implementation of the embodiment, an object-side surface of the fourth lens is an concave surface, and the optical lens assembly satisfy: $|R4| < |R7|$, $EP12/R4+EP34/R7 > -0.5$, where EP12 is the axial distance from the image-side surface of the first spacer to the object-side surface of the second spacer, EP34 is an axial distance from an image-side surface of the third spacer to an object-side surface of the fourth spacer, R4 is a radius of curvature of the image-side surface of the second lens, R7 is a radius of curvature of an object-side surface of the fourth lens.

In an implementation of the embodiment, the refractive indexes of the second and fifth lenses in the first lens to the sixth lens are largest, and $EP12 > T12$ and $EP45 > T45$ are satisfied. Here, EP12 is the axial distance from the image-side surface of the first spacer to the object-side surface of the second spacer, T12 is an axial spacing distance between the first lens and the second lens, EP45 is the axial distance from the image-side surface of the fourth spacer to the object-side surface of the fifth spacer, and T45 is an axial spacing distance between the fourth lens and the fifth lens.

In an implementation of the embodiment, the effective focal length f of the optical lens assembly, an inner diameter d1m of the image-side surface of the first spacer, and a maximal field-of-view FOV of the optical lens assembly satisfy: $1 < f/(d1m*tan(FOV)) < 5$.

According to an aspect of the present disclosure, an embodiment of the present disclosure provides an optical lens assembly. The optical lens assembly includes a lens barrel, and a first lens, a second lens, a third lens, a fourth lens, a fifth lens and a sixth lens that are sequentially disposed in the lens barrel from an object side to an image side; where the first lens has a positive refractive power, the second lens has a negative refractive power, and an image-side surface of the fifth lens is a convex surface; the lens barrel further comprises a plurality of spacers, and the plurality of spacers at least comprise a first spacer, a second spacer, a third spacer, a fourth spacer and a fifth spacer, wherein the first spacer is disposed between the first lens and the second lens and is in contact with an image-side surface of the first lens, the second spacer is disposed between the second lens and the third lens and is in contact with an image-side surface of the second lens, the third spacer is disposed between the third lens and the fourth lens and is in contact with an image-side surface of the third lens, the fourth spacer is disposed between the fourth lens and the fifth lens and is in contact with an image-side surface of the fourth lens, and the fifth spacer is disposed between the fifth lens and the sixth lens and is in contact with the image-side surface of the fifth lens; and an effective focal length f of the optical lens assembly, an outer diameter D0m of an image-side surface of the lens barrel, and an outer diameter D0s of an object-side surface of the lens barrel satisfy: $2 < f/(D0m-D0s) < 9$; and an axial spacing distance T56 from the fifth lens to the sixth lens, an axial distance EP45 from an image-side surface of the fourth spacer to an object-side surface of the fifth spacer, the effective focal length f of the optical lens assembly, and a radius of curvature R10 of the image-side surface of the fifth lens satisfy: $-25 < T56/EP45*f/R10 < -3$.

In an implementation of the present disclosure, an effective focal length f5 of the fifth lens, an effective focal length f4 of the fourth lens, an outer diameter D4m of the image-side surface of the fourth lens, and an inner diameter d4s of an object-side surface of the fourth spacer satisfy: $5 < |f5-f4|/(D4m-d4s) < 25$.

In an implementation of the present disclosure, the effective focal length f of the optical lens assembly, the inner diameter d4s of the object-side surface of the fourth spacer, and an inner diameter d2s of an object-side surface of the second spacer satisfy: $d4s > d2s$, and $5 < f^2/(d4s^2-d2s^2) < 30$.

In an implementation of the present disclosure, the inner diameter d4s of the object-side surface of the fourth spacer, an inner diameter d3m of an image-side surface of the third spacer, the inner diameter d2s of the object-side surface of the second spacer, and an inner diameter d3s of an object-side surface of the third spacer satisfy: $d4s/d3m > |d2s/d3s|$.

In an implementation of the present disclosure, the effective focal length f of the optical lens assembly, an inner diameter d5s of the object-side surface of the fifth spacer, and an outer diameter D5s of the object-side surface of the fifth spacer satisfy: $3 < f/(d5s-D5s) < 8$.

In an implementation of the present disclosure, the effective focal length f of the optical lens assembly, the maximal height L of the lens barrel, and a maximal field-of-view FOV of the optical lens assembly satisfy: $2 < f/(L*tan(FOV/2)) < 5$.

In an implementation of the present disclosure, an outer diameter D5m of an image-side surface of the fifth spacer, and a center thickness CT6 of the sixth lens satisfy:

$$5 < D5m/CT6 < 25.$$

In an implementation of the present disclosure, the outer diameter D0m of the image-side surface of the lens barrel and an axial distance TD from an object-side surface of the first lens to an image-side surface of the sixth lens satisfy: $1 < d0m/TD < 1.5$.

In an implementation of the present disclosure, an inner diameter d0m of the image-side surface of the lens barrel, the inner diameter d4s of the object-side surface of the fourth spacer, an axial distance Tr8r12 from the image-side surface of the fourth lens to the image-side surface of the sixth lens, and the maximal field-of-view FOV of the optical lens assembly satisfy: $3<(d0m-d4s)/(Tr8r12*\tan(FOV/2))<5$.

According to the technical solutions of the present disclosure, the optical lens assembly includes a lens barrel, and a first lens, a second lens, a third lens, a fourth lens, a fifth lens and a sixth lens that are sequentially disposed in the lens barrel from an object side to an image side; where a refractive power of the fifth lens and a refractive power of the sixth lens are positive-negative opposite, and an image-side surface of the fifth lens is a convex surface; the lens barrel further comprises a plurality of spacers, and the plurality of spacers at least comprise a fourth spacer and a fifth spacer, the fourth spacer being disposed between the fourth lens and the fifth lens and being in contact with an image-side surface of the fourth lens, and the fifth spacer being disposed between the fifth lens and the sixth lens and being in contact with the image-side surface of the fifth lens and an image-side surface of the sixth lens respectively; an axial distance EP45 from an image-side surface of the fourth spacer to an object-side surface of the fifth spacer, a center thickness CT5 of the fifth lens, an effective focal length f5 of the fifth lens, an effective focal length f6 of the sixth lens, and a radius of curvature R10 of the image-side surface of the fifth lens satisfy: $-0.5<EP45/CT5*|f5+f6|/R10<0$.

Generally, a telephoto optical lens assembly having six lenses has a large segment difference between the fourth lens and the fifth lens, but the setting of the large segment difference usually causes the problems of diffracted stray light and assembling credibility, and particularly, the two lenses before and after the position of the large segment difference will have the problem of credibility and the problem of poor MTF resolving power due to the assembling. In the embodiments of the present disclosure, by restricting the spacing distance between the fourth spacer and the fifth spacer, it is ensured that the ratio of the edge thickness of the fifth lens (i.e., the lens following the large segment difference) to the center thickness of the fifth lens is reasonable, which is conducive to the strength of the molded fifth lens, thus making the fifth lens deformed uneasily. At the same time, a certain pre-tightening assembly pressure is applied to the first to fourth lenses, thus avoiding the problem that the MTF resolving power of the optical lens assembly becomes poor due to the change of the gap (the change of the gap may be caused by the loosening of the first to fourth lenses due to the large segment difference and large gap between the fourth lens and the fifth lens) in a credibility and reliability test (e.g., when the optical lens assembly is in freefall). Therefore, this design ensures that this optical lens assembly has a strong product reliability life.

BRIEF DESCRIPTION OF THE DRAWINGS

The accompanying drawings of the specification constituting a part of the present disclosure are used to provide a further understanding of the present disclosure, and the schematic embodiments of the present disclosure and the descriptions thereof are used to explain the present disclosure, and do not constitute an improper limitation to the present disclosure. In the accompanying drawings.

Figure 1:
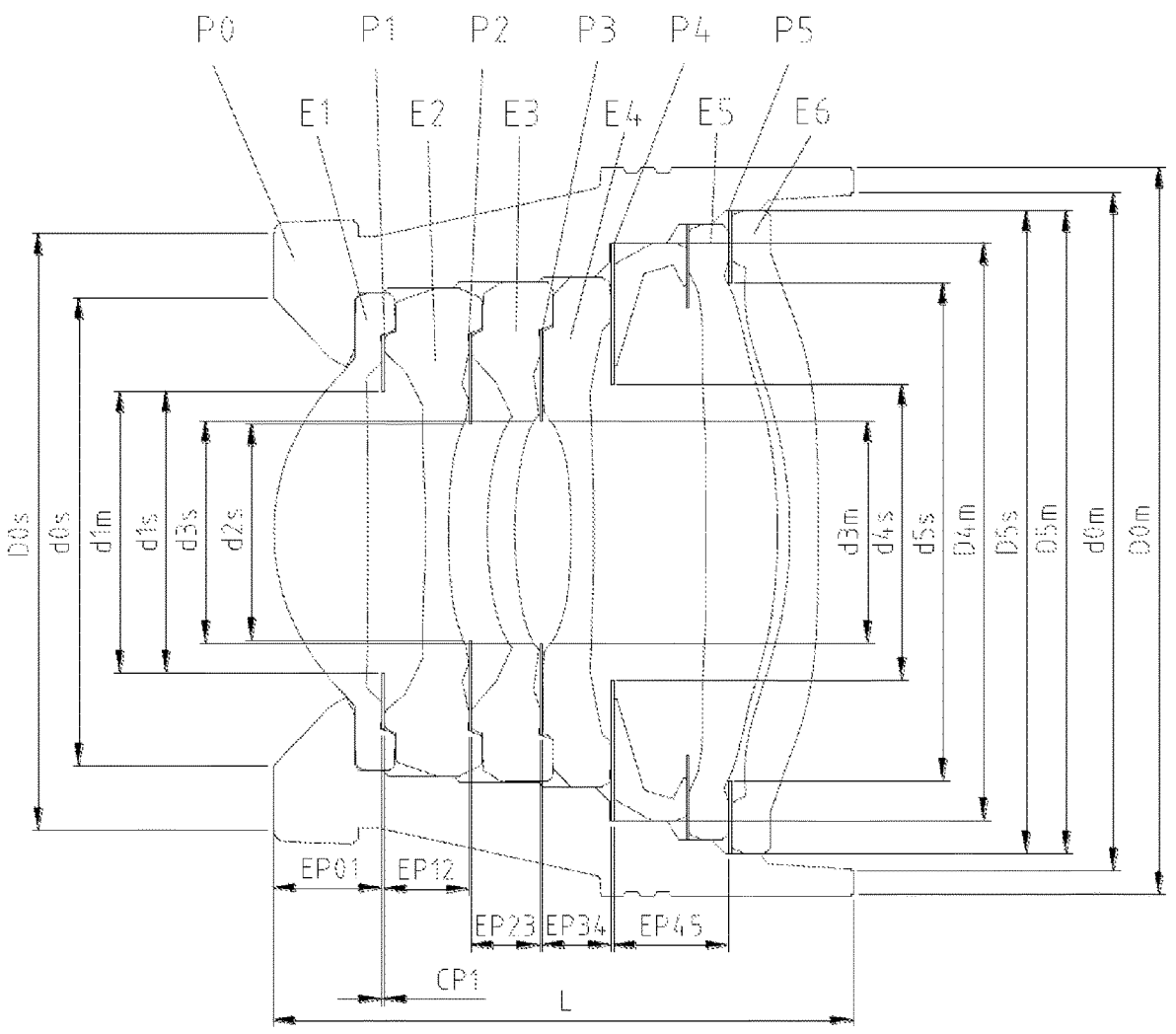
FIG. 1 is a dimensioned diagram of an optical lens assembly according to an alternative embodiment of the present disclosure.

Here, the above accompanying diagrams include the following reference numerals:

P0: lens barrel; E1: first lens; S1: object-side surface of the first lens; S2: image-side surface of the first lens; E2: second lens; S3: object-side surface of the second lens; S4: image-side surface of the second lens; E3: third lens; S5: object-side surface of the third lens; S6: image-side surface of the third lens; E4: fourth lens; S7: object-side surface of the fourth lens; S8: image-side surface of the fourth lens; E5: fifth lens; S9: object-side surface of the fifth lens; S10: image-side surface of the fifth lens; E6: sixth lens; S11: object-side surface of the sixth lens; S12: image-side surface of the sixth lens; P1: first spacer; P2: second spacer; P3: third spacer; P4: fourth spacer; and P5: fifth spacer.

DETAILED DESCRIPTION OF EMBODIMENTS

It should be noted that embodiments in the present disclosure and the features in the embodiments may be combined with each other on a non-conflict basis. Embodiments of the present disclosure will be described below in detail with reference to the accompanying drawings.

It should be noted that, unless otherwise specified, all technical and scientific terms used in the present disclosure have the same meaning as commonly understood by those of ordinary skill in the art to which the present disclosure belongs.

In the present disclosure, unless stated otherwise, the used orientations such as "upper, lower, top and bottom" are generally for the directions shown in the accompanying drawings, or for the parts themselves in a vertical, perpendicular or gravitational direction. Similarly, for the convenience of understanding and description, "inner and outer"

refer to being inner and outer relative to the contours of the parts themselves. However, the above orientations are not used to limit the present disclosure.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. The determination for the surface shape at the paraxial area may be according to the determination approach of those of ordinary skill in the art, in which whether the surface is concave or convex is determined according to whether the R value (R refers to a radius of curvature at the paraxial area, and the R value usually refers to the R value on a lens database (lens data) in optical software) is positive or negative. For a light-incident-side surface, it is determined that the surface is a convex surface when the R value is positive, and it is determined that the surface is a concave surface when the R value is negative. For a light-emitting-side surface, it is determined that the surface is a concave surface when the R value is positive, and it is determined that the surface is a convex surface when the R value is negative.

In order to solve the problems of diffracted stray light and assembling credibility of the optical lens assembly in the prior art, embodiments of the present disclosure provides an optical lens assembly.

Embodiment 1

As shown in FIGS. 1-22, an optical lens assembly includes a lens barrel, and a first lens, a second lens, a third lens, a fourth lens, a fifth lens and a sixth lens that are sequentially disposed in the lens barrel from an object side to an image side. The fifth lens and the sixth lens are positive-negative opposite, and an image-side surface of the fifth lens is a convex surface. The lens barrel further includes a plurality of spacers, and the plurality of spacers at least include a fourth spacer and a fifth spacer, where the fourth spacer is disposed between the fourth lens and the fifth lens and is in contact with an image-side surface of the fourth lens, and the fifth spacer is disposed between the fifth lens and the sixth lens and is in contact with the image-side surface of the fifth lens and an image-side surface of the sixth lens respectively. An axial distance EP45 from an image-side surface of the fourth spacer to an object-side surface of the fifth spacer, a center thickness CT5 of the fifth lens, an effective focal length f5 of the fifth lens, an effective focal length f6 of the sixth lens, and a radius of curvature R10 of the image-side surface of the fifth lens satisfy: $-0.5 < EP45/CT5 * |f5+f6|/R10 < 0$.

Preferably, the axial distance EP45 from the image-side surface of the fourth spacer to the object-side surface of the fifth spacer, the center thickness CT5 of the fifth lens, the effective focal length f5 of the fifth lens, the effective focal length f6 of the sixth lens, and the radius of curvature R10 of the image-side surface of the fifth lens satisfy: $-0.45 \leq EP45/CT5 * |f5+f6|/R10 \leq -0.01$.

Generally, a telephoto optical lens assembly having six lenses has a large segment difference between the fourth lens and the fifth lens, but the setting of the large segment difference usually causes the problems of diffracted stray light and assembling credibility, and particularly, the two lenses before and after the position of the large segment difference will have the problem of credibility and the problem of poor MTF resolving power due to the assembling. In the embodiment of the present disclosure, by restricting the spacing distance between the fourth spacer and the fifth spacer, it is ensured that the ratio of the edge thickness of the fifth lens (i.e., the lens following the large segment difference) to the center thickness of the fifth lens is reasonable, which is conducive to the strength of the molded fifth lens, thus making the fifth lens deformed uneasily. At the same time, a certain pre-tightening assembly pressure is applied to the first to fourth lenses, thus avoiding the problem that the MTF resolving power of the optical lens assembly becomes poor due to the change of the gap (the change of the gap may be caused by the loosening of the first to fourth lenses due to the large segment difference and large gap between the fourth lens and the fifth lens) in a credibility and reliability test (e.g., when the optical lens assembly is in freefall). Therefore, this design ensures that this optical lens assembly has a strong product reliability life.

In this embodiment, an effective focal length f of the optical lens assembly, an inner diameter d0m of an image-side surface of the lens barrel, and an axial distance TD from an object-side surface of the first lens to the image-side surface of the sixth lens satisfy: $1 < f*f/(d0m*TD) < 2.5$. By reasonably controlling the effective focal length f of the optical lens assembly, the inner diameter of the image-side surface of the lens barrel, and the axial distance from the object-side surface of the first lens to the image-side surface of the sixth lens, the long focal length and miniaturization of the optical lens assembly can be quickly realized, and the large-aperture characteristic can be obtained. Preferably, $1.40 \leq f*f/(d0m*TD) \leq 2.12$.

In this embodiment, the plurality of spacers further include a first spacer, a second spacer, and a third spacer. The first spacer is disposed between the first lens and the second lens and is in contact with an image-side surface of the first lens. The second spacer is disposed between the second lens and the third lens and is in contact with an image-side surface of the second lens. The third spacer is disposed between the third lens and the fourth lens and is in contact with an image-side surface of the third lens. An axial distance EP12 from an image-side surface of the first spacer to an object-side surface of the second spacer and an axial distance EP23 from an image-side surface of the second spacer to an object-side surface of the third spacer satisfy: EP12>EP23. This setting can reasonably allocate the distance between the first lens and the second lens, which is conducive to controlling the refractive powers and surface shapes of the lenses, and is conducive to controlling the trend of the entrance pupil light and the smooth transition of light. At the same time, by controlling the distance, the spacers can effectively block the diffracted stray light, thereby increasing the stability of the imaging and improving the imaging quality.

In this embodiment, an effective focal length f2 of the second lens, the axial distance EP12 from the image-side surface of the first spacer to the object-side surface of the second spacer, and the axial distance EP23 from the image-side surface of the second spacer to the object-side surface of the third spacer satisfy: $-100 < f2/(EP12-EP23) < -10$. When this conditional expression is satisfied, it can be ensured that the aperture of the optical lens assembly is large, and at the same time, the directional reflection of light can be controlled, such that the excess stray light can be better absorbed by the spacers, which is conducive to ensuring that the chief ray still has a good imaging quality in a dark environment. Preferably, $-97.94 \leq f2/(EP12-EP23) \leq -17.89$.

In this embodiment, a radius of curvature R4 of the image-side surface of the second lens, a radius of curvature R1 of the object-side surface of the first lens, the axial distance EP12 from the image-side surface of the first spacer to the object-side surface of the second spacer, and a center thickness CT2 of the second lens satisfy: $3 < (R4-R1)/(EP12-CT2) < 50$. By controlling this conditional expression, the center thickness of the second lens and the distance between the second lens and the first lens can be controlled, thereby ensuring the processability and assembling reliability of the second lens. By controlling the radii of curvature of the lenses, the air gap between the first lens and the second lens can be reasonably controlled, and thus, the field curvature of the system can be controlled, thereby reducing the field curvature sensitivity, and improving the assembling stability of the optical lens assembly. Preferably, $3.29 \leq (R4-R1)/(EP12-CT2) \leq 46.25$.

In this embodiment, the axial distance EP45 from the image-side surface of the fourth spacer to the object-side surface of the fifth spacer, the axial distance TD from the object-side surface of the first lens to the image-side surface of the sixth lens, the radius of curvature R10 of the image-side surface of the fifth lens, a radius of curvature R9 of an object-side surface of the fifth lens, and the effective focal length f of the optical lens assembly satisfy: $-2 < EP45/TD*(R10-R9)/f < 0$. By controlling the above conditional expression, it is possible to reasonably control the radius of curvature of the image-side surface of the fifth lens not to be out of tolerance, which controls the sagittal height of the lens within a certain range, thereby reducing the difficulty in molding the lens. In addition, by controlling the radii of curvature of the fifth lens, the deflection of light in the fifth lens can be mitigated, which effectively reduces the sensitivity of the fifth lens. At the same time, the controlling is conducive to the convergence of light on the surfaces of the fifth lens, thereby reducing the stray light reflected from the surfaces of the fifth lens. Preferably, $-1.15 \leq EP45/TD*(R10-R9)/f \leq -0.06$.

In this embodiment, a combined focal length f1234 of the first lens, the second lens, the third lens, and the fourth lens, an axial distance EP01 from an object-side surface of the lens barrel to an object-side surface of the first spacer, the axial distance EP12 from the image-side surface of the first spacer to the object-side surface of the second spacer, the axial distance EP23 from the image-side surface of the second spacer to the object-side surface of the third spacer, and an axial distance EP34 from an image-side surface of the third spacer to an object-side surface of the fourth spacer satisfy: $2 < f1234/(EP01+EP12+EP23+EP34) < 5$. By controlling the combined focal length and the sum of axial distance between the spacers, the magnification ratio of the telephoto lens assembly can be satisfied, and the distortion range of the system can be controlled while the magnification effect during shooting with a long focal length is ensured, such that the system has small distortion, and it is ensured that the total length of the optical lens assembly is not too long, thus ensuring that the optical lens assembly and the modules are light and thin as a whole. Preferably, $2.85 \leq f1234/(EP01+EP12+EP23+EP34) \leq 4.21$.

In this embodiment, the radius of curvature R1 of the object-side surface of the first lens, a maximal thickness CP1 of the first spacer, and the axial distance EP01 from the object-side surface of the lens barrel to the object-side surface of the first spacer satisfy: $1 < R1/(CP1+EP01) < 2$. When this conditional expression is satisfied, it is possible to make the optical lens assembly obtain sufficient incident light intensity while optimizing the large-aperture characteristic of the system, to ensure that sufficient light beams reach the image plane. Accordingly, the imaging quality in environments of poor light is optimized, and the problem that the first lens protrudes from the lens barrel is effectively solved, which effectively prevents the lens from being dirty and the coating from being polluted during production, thereby improving the appearance yield of the optical lens assembly during production. Preferably, $1.17 \leq R1/(CP1+EP01) \leq 1.96$.

In this embodiment, an inner diameter dos of the object-side surface of the lens barrel, an inner diameter d1s of the object-side surface of the first spacer, a center thickness CT1 of the first lens, and an F-number Fno of the optical lens assembly satisfy: $4 < (d0s-d1s)/CT1*Fno < 12$. When this conditional expression is satisfied, it is possible to make the optical lens assembly have an enough entrance pupil diameter while ensuring that the size of the head of the optical lens assembly is small, and thus, excess diffracted stray light can be absorbed, the tolerance requirements during production can be met, thereby effectively reducing the difficulty in molding the lens. Preferably, $4.51 \leq (d0s-d1s)/CT1*Fno \leq 11.16$.

In this embodiment, the inner diameter d1s of the object-side surface of the first spacer, the center thickness CT1 of the first lens, an effective focal length f1 of the first lens, and the radius of curvature R1 of the object-side surface of the first lens satisfy: $4 < d1s/CT1*f1/R1 < 8$. By controlling this conditional expression, it is possible to control the amount of light entering the second lens in the optical lens assembly, which avoids the stray light generated after the light passes through the second lens. The control also helps to avoids the problems of transmission and internal reflection of stray light between the first lens and the second lens, to improve the imaging quality of the optical lens assembly, thereby improving the stray light yield of the optical lens assembly. At the same time, the control helps to improve the molding manufacturability of the first lens and the second lens, thereby improving the assembling stability. Preferably, $4.63 \leq d1s/CT1*f1/R1 \leq 7.12$.

In this embodiment, the effective focal length f of the optical lens assembly, the inner diameter d0m of the image-side surface of the lens barrel, and an outer diameter D0s of the object-side surface of the lens barrel satisfy: $f/|d0m-D0s| > 4$. It needs to consider the rationality of the shape of the overall structure and the possibility of molding and processing of the optical lens assembly, while meeting the imaging requirements. The outer diameter of the foremost end of the lens barrel facing the object side and the outer diameter of the rearmost end of the lens barrel facing the image side are as close as possible, which can ensure the feasibility of molding the lens barrel and at the same time, which is conducive to the optical characteristics of the telephoto lens assembly. Meanwhile, it is required to ensure that the bearing position of the lens barrel is thick enough, thereby improving the assembling stability. Preferably, $4.07 \leq f/|d0m-D0s|$.

In this embodiment, an object-side surface of the fourth lens is a concave surface, and the optical lens assembly satisfies $|R4|<|R7|$ and $EP12/R4+EP34/R7>-0.5$. Here, EP12 is the axial distance from the image-side surface of the first spacer to the object-side surface of the second spacer, EP34 is the axial distance from the image-side surface of the third spacer to the object-side surface of the fourth spacer, R4 is the radius of curvature of the image-side surface of the second lens, and R7 is a radius of curvature of the object-side surface of the fourth lens. By controlling this conditional expression, the edge thicknesses of the second lens and the fourth lens can be controlled, which reduces the difficulty in molding the second lens and the fourth lens and improves the molding yield rate and surface-shape stability of the second lens and the fourth lens, thereby improving the yield rate of the optical lens assembly and reducing the cost. Moreover, since the fourth lens has a larger outer diameter than that of the second lens, it is required to control the radii of curvature of the lenses to reduce the degrees of bending of the lenses, thereby reducing the length of the overall optical lens assembly. Preferably, $-0.14 \leq EP12/R4+EP34/R7$.

In this embodiment, the refractive indexes of the second and fifth lenses in the first lens to the sixth lens are largest, and $EP12>T12$ and $EP45>T45$ are satisfied. Here, EP12 is the axial distance from the image-side surface of the first spacer to the object-side surface of the second spacer, T12 is an axial spacing distance between the first lens and the second lens, EP45 is the axial distance from the image-side surface of the fourth spacer to the object-side surface of the fifth spacer, and T45 is an axial spacing distance between the fourth lens and the fifth lens. This setting can reasonably control the air gap between the first lens and the second lens and the air gap between the fourth lens and the fifth lens, which ensures that the center thicknesses of the lenses on the optical axis and the edge thicknesses of the lenses are within a certain reasonable range, and thus, the difficulty in molding the second lens and the fifth lens is effectively reduced, and the molding stability is improved. Preferably, $0.01 \leq EP12-T12 \leq 0.53$, and $0.02 \leq EP45-T45 \leq 0.55$.

In this embodiment, the effective focal length f of the optical lens assembly, an inner diameter dim of the image-side surface of the first spacer, and a maximal field-of-view FOV of the optical lens assembly satisfy: $1<f/(d1m*tan(FOV))<5$. By controlling the maximal field-of-view of the optical lens assembly, the telephoto characteristic of the optical lens assembly can be maintained, and the distant object can be photographed more clearly, thereby having a good magnification characteristic. In addition, by controlling the inner diameter of the first spacer, the stray light near light in FOV can be optimized, and the excess stray light can be absorbed by using the size of the diameter of the spacer. Preferably, $1.50 \leq f/(d1m*tan(FOV)) \leq 3.53$.

Embodiment 2

As shown in FIGS. 1-22, an optical lens assembly includes a lens barrel, and a first lens, a second lens, a third lens, a fourth lens, a fifth lens, and a sixth lens that are sequentially disposed in the lens barrel from an object side to an image side. The first lens has a positive refractive power, the second lens has a negative refractive power, and an image-side surface of the fifth lens is a convex surface. The lens barrel further includes a plurality of spacers, and the plurality of spacers at least include a first spacer, a second spacer, a third spacer, a fourth spacer, and a fifth spacer. The first spacer is disposed between the first lens and the second lens and is in contact with an image-side surface of the first lens, the second spacer is disposed between the second lens and the third lens and is in contact with an image-side surface of the second lens, the third spacer is disposed between the third lens and the fourth lens and is in contact with an image-side surface of the third lens, the fourth spacer is disposed between the fourth lens and the fifth lens and is in contact with an image-side surface of the fourth lens, and the fifth spacer is disposed between the fifth lens and the sixth lens and is in contact with the image-side surface of the fifth lens. An effective focal length f of the optical lens assembly, an outer diameter D0m of an image-side surface of the lens barrel, and an outer diameter D0s of an object-side surface of the lens barrel satisfy: $2<f/(D0m-D0s)<9$. An axial spacing distance T56 from the fifth lens to the sixth lens, an axial distance EP45 from an image-side surface of the fourth spacer to an object-side surface of the fifth spacer, the effective focal length f of the optical lens assembly, and a radius of curvature R10 of the image-side surface of the fifth lens satisfy: $-25<T56/EP45*f/R10<-3$.

Preferably, $2.97 \leq f/(D0m-D0s) \leq 7.94$, and $-21.72 \leq T56/EP45*f/R10 \leq -3.69$.

Generally, during assembling, the last three lenses of a telephoto optical lens assembly composing of six lenses will be unstable and produce diffracted stray light at a position where the spacing distance is large. The optical lens assembly in an embodiment of the present disclosure satisfies the above restriction, and controls the air gap within a reasonable range to improve the assembling stability of the optical lens assembly, which helps to intercept an unwanted diffraction optical path from the fourth lens to the sixth lens, thereby improving the imaging cleanness of the optical lens assembly and reducing the generation of stray light.

In this embodiment, an effective focal length f5 of the fifth lens, an effective focal length f4 of the fourth lens, an outer diameter D4m of the image-side surface of the fourth lens, and an inner diameter d4s of an object-side surface of the fourth spacer satisfy: $5<|f5-f4|/(D4m-d4s)<25$. By controlling this conditional expression, the bandwidth of the fourth spacer can be effectively controlled, which controls the amount of light passing through the fourth spacer. Accordingly, on the one hand, the excess stray light reflected by the lenses can be reduced, and on the other hand, the principal value of the optical lens assembly can be improved, which finally makes the principal value, imaging effect and stray light effect of the optical lens assembly meet the demands of users. Preferably, $6.99 \leq |f5-f4|/(D4m-d4s) \leq 23.34$.

In this embodiment, the effective focal length f of the optical lens assembly, the inner diameter d4s of the object-side surface of the fourth spacer, and an inner diameter d2s of an object-side surface of the second spacer satisfy: $d4s>d2s$, and $5<f^2/(d4s^2-d2s^2)<30$. By controlling this conditional expression, the minimal inner diameters of the second and fourth spacers can be effectively controlled, and thus, the relative illumination at the edge field of view of the optical lens assembly can be controlled, such that the optical lens assembly still has a good image quality in environments of poor light or in the evening. In addition, stray light often occurs at the fourth spacer, by controlling a reasonable inner diameter, the stray light hitting the inner wall of the spacer can be effectively solved, thereby improving the stray light effect. Preferably, $7.33 \leq f^2/(d4s^2-d2s^2) \leq 28.26$.

In this embodiment, the inner diameter d4s of the object-side surface of the fourth spacer, an inner diameter d3m of an image-side surface of the third spacer, the inner diameter d2s of the object-side surface of the second spacer, and an inner diameter d3s of an object-side surface of the third spacer satisfy: $d4s/d3m > |d2s/d3s|$. By controlling this conditional expression, the inner diameters of the object-side and image-side surfaces of the third spacer can be effectively controlled, such that the third spacer has a certain chamfer shape at the inner diameter. Accordingly, it is possible to cause the excess light refracted by the first to third lenses to hit the inner-diameter chamfer of the third spacer to be absorbed, and thus, the excess stray light will not be reflected, thereby improving the imaging quality of the optical lens assembly. Preferably, $0.21 \leq d4s/d3m - |d2s/d3s| \leq 0.61$.

In this embodiment, the effective focal length f of the optical lens assembly, an inner diameter d5s of the object-side surface of the fifth spacer, and an outer diameter D5s of the object-side surface of the fifth spacer satisfy: $3 < f/(d5s-D5s) < 8$. By controlling the inner and outer diameters of the fifth spacer, the degree of bending of the surfaces of the sixth lens and the ratio of the outer diameter to the center thickness of the sixth lens can be effectively controlled, which ensures that the sixth lens has good mold releasability, thereby avoiding the impact on the stray light and performance due to the abnormal release situation caused by poor releasability of the sixth lens. Meanwhile, the inner diameter of the fifth spacer can be controlled, which can effectively block the stray light generated by other elements on the object side and image side of the fifth spacer, thereby reducing the stray light hitting on the image plane and improving the imaging quality. Preferably, $3.71 \leq f/(d5s-D5s) \leq 7.24$.

In this embodiment, the effective focal length f of the optical lens assembly, the maximal height L of the lens barrel, and a maximal field-of-view FOV of the optical lens assembly satisfy: $2 < f/(L*\tan(FOV/2)) < 5$. By controlling the effective focal length of the optical lens assembly, the telephoto characteristic can be quickly realized. By controlling the FOV, the optical lens assembly can have a large-aperture characteristic while ensuring miniaturization. In addition, by controlling the maximal height of the lens barrel, the thicknesses of the lenses can be made uniform, and the uniform wall thickness of the optical lens assembly reduces the difficulty in molding the entire lens assembly, thereby improving the production yield. At the same time, it be can ensured that the lens will not protrude to produce interference between the lens of the optical lens assembly and the packaging box during production, which causes the problems of appearance pollution and low yield. Preferably, $2.68 \leq f/(L*\tan(FOV/2)) \leq 3.59$.

In this embodiment, an outer diameter D5m of an image-side surface of the fifth spacer, and a center thickness CT6 of the sixth lens satisfy: $5 < D5m/CT6 < 25$. The outer diameter of the last lens is largest and thus has a high molding difficulty. By controlling this conditional expression, the center thickness of the sixth lens can be effectively controlled, thereby reducing the ratio of the outer diameter to the center thickness of the sixth lens. At the same time, the thickness ratio of the sixth lens can be reduced, thereby greatly reducing the difficulty in molding the last lens. Accordingly, the peak-value stability and field curvature stability of the overall optical lens assembly can be improved, thereby improving the imaging quality. Preferably, $5.79 \leq D5m/CT6 \leq 23.85$.

In this embodiment, the outer diameter D0m of the image-side surface of the lens barrel and an axial distance TD from an object-side surface of the first lens to an image-side surface of the sixth lens satisfy: $1 < d0m/TD < 1.5$. By controlling this conditional expression, the distortion range of the telephoto lens assembly can be reasonably controlled, such that the system has less distortion. By controlling the inner diameter of the image-side surface of the lens barrel, the problem of light leakage caused when the light hits the first lens from the inner diameter of the lens barrel can be effectively solved. Since this has a great impact on the matching degree of the principal value CRA and the chip, the inner diameter can usually be controlled to improve the CRA. The sharp corner of the inner diameter of the lens barrel is also a risky position where flocculent stray light and feather stray light are highly produced, and thus, the flocculent stray light and feather stray light can be further reduced by adjusting the size of the inner diameter, thereby improving the overall quality of the optical lens assembly. Preferably, $1.07 \leq d0m/TD \leq 1.49$.

In this embodiment, an inner diameter d0m of the image-side surface of the lens barrel, the inner diameter d4s of the object-side surface of the fourth spacer, an axial distance Tr8r12 from the image-side surface of the fourth lens to the image-side surface of the sixth lens, and the maximal field-of-view FOV of the optical lens assembly satisfy: $3 < (d0m-d4s)/(Tr8r12*\tan(FOV/2)) < 5$. By controlling the axial distance from the image-side surface of the fourth lens to the image-side surface of the sixth lens, the air gap between the fourth lens and the fifth lens can be effectively controlled to realize the telephoto characteristic of the telephoto lens assembly. On the one hand, an appropriate processing thickness is provided to a spacer ring, thereby reducing the difficulty in processing a single part, and improving the assembling stability of the overall optical lens assembly. On the other hand, due to the telephoto characteristic, there is a large segment difference and a large gap between the fourth lens and the fifth lens. By controlling the axial distance, the assembling stability of the spacer ring, the fifth lens and the sixth lens can be improved, and thus the spacer ring, the fifth lens and the sixth lens will not be greatly deformed during assembling, thereby improving the stability of the field curvature of the lens assembly. Accordingly, during photographing, the intersection point of the entire light beam coincides with the ideal image point, which makes the entire image plane clearer and improves the overall imaging quality of the optical lens assembly. Preferably, $3.04 \leq (d0m-d4s)/(Tr8r12*\tan(FOV/2)) \leq 4.13$.

Alternatively, the above optical lens assembly may further include a protective glass for protecting a photosensitive element on an image plane.

The optical lens assembly in the present disclosure may use a plurality of lenses, for example, the above six lenses. In the present disclosure, at least one of the surfaces of the lenses is an aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical lens assembly without departing from the technical solution claimed by the present disclosure. As an example, although the optical lens assembly having six lenses is described as an example in the implementations, the optical lens assembly is not limited to including the six lenses. If desired, the optical lens assembly may also include other numbers of lenses.

FIG. 1 is a schematic structural diagram of an optical lens assembly according to the present disclosure. Here, parameters such as D0s, d0s, d1m, d1s, d3s, d2s, d3m, d4s, d5s, D4m, D5s, D5m, d0m, D0m, EP01, EP12, EP23, EP34, EP45, L and CP1 are marked in FIG. 1, so as to clearly and intuitively understand the meanings of the parameters. In order to facilitate the optical lens assembly and the specific surface types, these parameters will not be shown in the accompanying drawings when described in the following detailed examples.

Examples of detailed surface types and parameters of the optical lens assembly that may be applicable to the above implementations are further described below with reference to the accompanying drawings.

It should be noted that there is a first state, a second state and a third state in the following examples. For the optical lens assemblies in the first state, the second state and the third state, parameters such as radii of curvature and center thicknesses of the first to sixth lenses, the spacing distances between the lenses and the high-order coefficients of the lenses are the same, but the parameters such as thicknesses, inner diameters and outer diameters of the lens barrels and the first to fifth spacers and the shapes of some lenses are different. In other words, the main structures for imaging are the same, but the auxiliary structures for imaging are different.

It should be noted that any one of Examples 1-3 described below is applicable to all embodiments of the present disclosure.

Example 1

Figure 2:
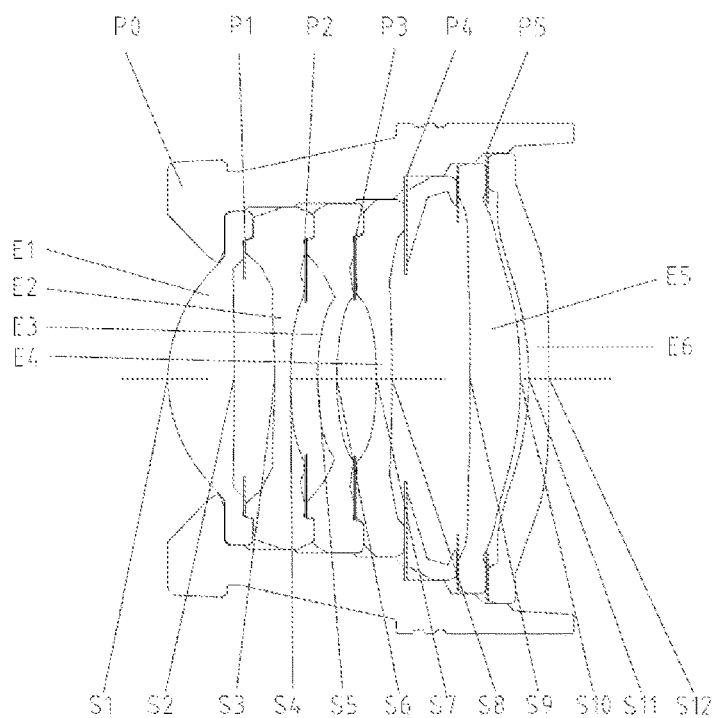
FIG. 2 is a schematic structural diagram of an optical lens assembly in a first state of Example 1 of the present disclosure.
Figure 3:
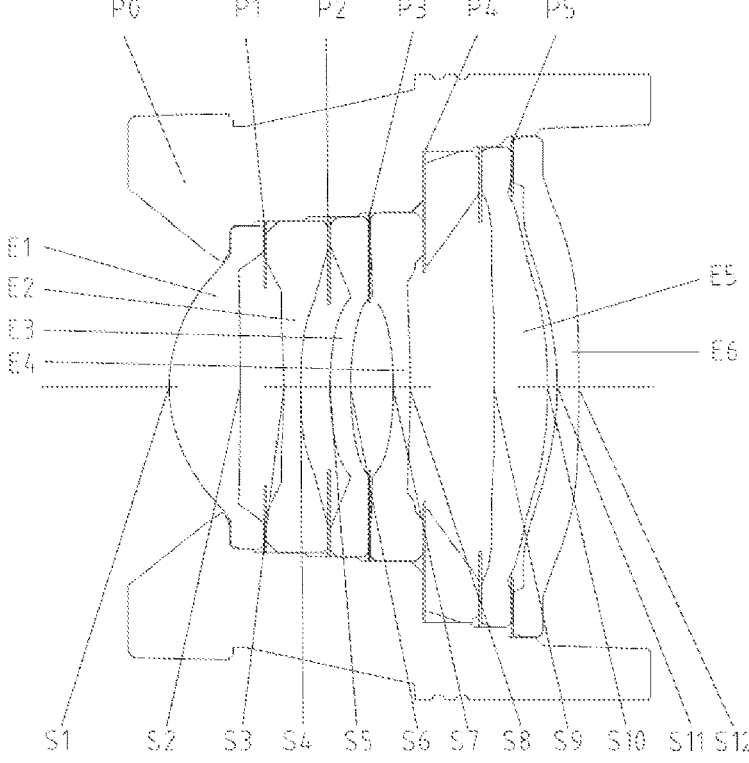
FIG. 3 is a schematic structural diagram of the optical lens assembly in a second state of Example 1 of the present disclosure.
Figure 4:
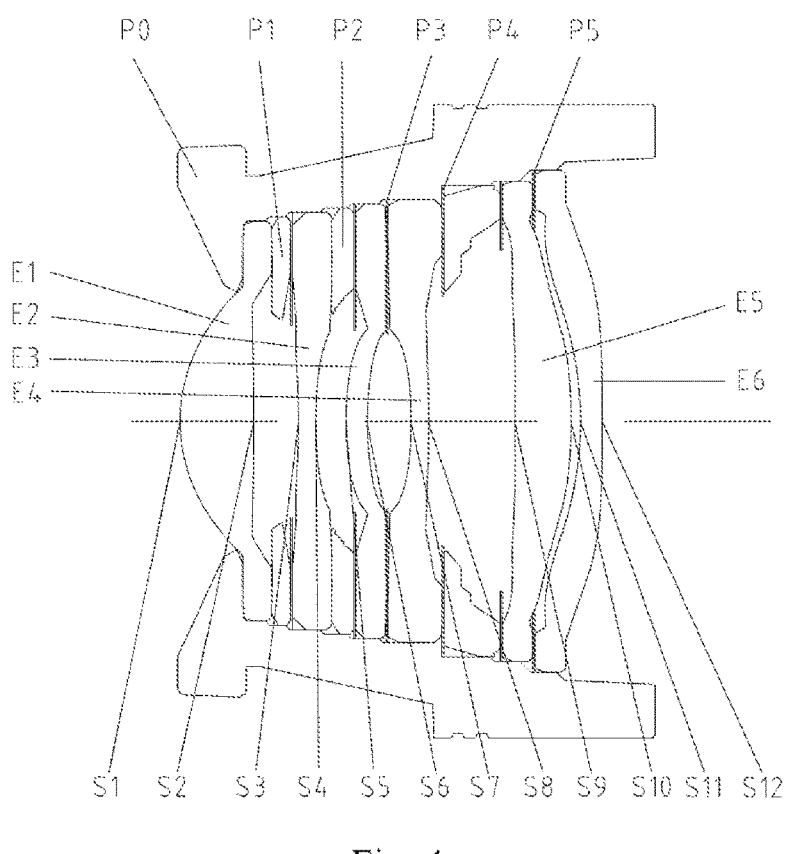
FIG. 4 is a schematic structural diagram of the optical lens assembly in a third state of Example 1 of the present disclosure.

As shown in FIGS. 2-8, an optical lens assembly in Example 1 is described. FIG. 2 is a schematic structural diagram of the optical lens assembly in Example 1 in a first state, FIG. 3 is a schematic structural diagram of the optical lens assembly in Example 1 in a second state, and FIG. 4 is a schematic structural diagram of the optical lens assembly in Example 1 in a third state.

As shown in FIGS. 2-4, the optical lens assembly includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5 and a sixth lens E6 that are sequentially disposed in the lens barrel P0 along the optical axis of the lens barrel P0 from an object side to an image side.

As shown in FIG. 2, in the first state, on the image side of the fourth spacer, the optical lens assembly further includes a spacer ring and septum that are used for assisting the fourth spacer in bearing. An object-side surface and an image-side surface of the first spacer P1 are at least partially abutted against an image-side surface S2 of the first lens and an object-side surface S3 of the second lens respectively, and an outer periphery of the first spacer P1 is abutted against the first lens E1. An object-side surface and an image-side surface of the second spacer P2 are respectively at least partially abutted against an image-side surface S4 of the second lens and an object-side surface S5 of the third lens, and an outer periphery of the second spacer P2 is abutted against the second lens E2. An object-side surface and an image-side surface of the third spacer P3 are respectively at least partially abutted against an image-side surface S6 of the third lens and an object-side surface S7 of the fourth lens, and an outer periphery of the third spacer P3 is abutted against the third lens E3. An object-side surface and an image-side surface of the fourth spacer P4 are respectively abutted against an image-side surface S8 of the fourth lens and an object-side surface of the spacer ring, and an outer periphery of the fourth spacer P4 is abutted against an inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

As shown in FIG. 3, in the second state, on the image side of the fourth spacer, the optical lens assembly further includes a spacer ring and septum that are used for assisting the fourth spacer in bearing. An object-side surface and an image-side surface of the first spacer P1 are respectively at least partially abutted against an image-side surface S2 of the first lens and an object-side surface S3 of the second lens, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface S5 of the third lens, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

As shown in FIG. 4, in the third state, the optical lens assembly further includes a septum, used for assisting the first spacer in bearing, on the image side of the first spacer; a septum, used for assisting the second spacer in bearing, on the image side of the second spacer; and a spacer ring and a septum, used for assisting the fourth spacer in bearing, on the image side of the fourth spacer. An object-side surface and an image-side surface of the first spacer P1 are respectively at least partially abutted against an image-side surface S2 of the first lens and an object-side surface of the septum, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface of the septum, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

In summary, the parameters of the optical lens assembly in Example 1 in the first state 1-1, the second state 1-2 and the third state 1-3 are as shown in Table 1.

TABLE 1

| parameter | state | | |
|---|---|---|---|
| | 1-1 | 1-2 | 1-3 |
| d1s(mm) | 2.54 | 3.36 | 2.34 |
| d1m(mm) | 2.54 | 3.36 | 3.33 |
| d2s(mm) | 1.95 | 1.97 | 2.46 |
| d3s(mm) | 2.00 | 2.00 | 2.00 |
| d3m(mm) | 2.00 | 2.00 | 2.00 |
| d4s(mm) | 2.66 | 2.73 | 2.87 |
| D4m(mm) | 5.20 | 5.61 | 5.43 |
| d5s(mm) | 4.48 | 4.54 | 4.44 |
| D5s(mm) | 5.79 | 5.96 | 5.79 |
| D5m(mm) | 5.79 | 5.96 | 5.79 |
| d0s(mm) | 4.22 | 4.72 | 5.43 |
| d0m(mm) | 6.06 | 6.24 | 6.06 |
| D0s(mm) | 5.57 | 6.45 | 6.31 |
| D0m(mm) | 6.57 | 7.45 | 7.31 |
| L(mm) | 5.17 | 6.19 | 5.49 |
| EP01(mm) | 0.97 | 1.62 | 1.09 |
| CP1(mm) | 0.02 | 0.02 | 0.17 |
| EP12(mm) | 0.75 | 0.72 | 0.52 |
| EP23(mm) | 0.61 | 0.46 | 0.35 |
| EP34(mm) | 0.62 | 0.63 | 0.63 |
| EP45(mm) | 1.02 | 1.03 | 1.03 |

In Example 1, an object-side surface S1 of the first lens is a convex surface, and the image-side surface S2 of the first lens is a convex surface. The object-side surface S3 of the second lens is a concave surface, and the image-side surface S4 of the second lens is a concave surface. The object-side surface S5 of the third lens is a convex surface, and the image-side surface S6 of the third lens is a concave surface. The object-side surface S7 of the fourth lens is a concave surface, and the image-side surface S8 of the fourth lens is a concave surface. An object-side surface S9 of the fifth lens is a convex surface, and the image-side surface S10 of the fifth lens is a convex surface. The object-side surface S11 of the sixth lens is a concave surface, and an image-side surface S12 of the sixth lens is a convex surface.

In Example 1, an effective focal length f of the optical lens assembly is 7.90 mm, an effective focal length f1 of the first lens is 3.43 mm, an effective focal length f2 of the second lens is −4.87, an effective focal length f3 of the third lens is 185.34 mm, an effective focal length f4 of the fourth lens is −12.79 mm, an effective focal length f5 of the fifth lens is 7.32 mm, an effective focal length f6 of the sixth lens is −7.36 mm, a maximal field-of-view FOV of the optical lens assembly is 46.1°, and an F-number Fno of the optical lens assembly is 2.80.

Table 2 is a table showing basic structural parameters of the optical lens assembly in Example 1. Here, the units of a radius of curvature and a thickness/distance are millimeters (mm).

TABLE 2

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.9158 | 0.8446 | 1.55 | 56.10 | −0.0067 |
| S2 | aspheric | −69.1440 | 0.5104 | | | 99.0000 |
| S3 | aspheric | −8.6525 | 0.2000 | 1.67 | 20.40 | −99.0000 |
| S4 | aspheric | 5.2388 | 0.3471 | | | 1.9708 |
| S5 | aspheric | 3.3606 | 0.2446 | 1.55 | 56.10 | 1.5402 |
| S6 | aspheric | 3.3868 | 0.5067 | | | 1.2226 |
| S7 | aspheric | −7.2046 | 0.2000 | 1.55 | 56.10 | 43.9433 |
| S8 | aspheric | 225.6637 | 0.9956 | | | 99.0000 |
| S9 | aspheric | 21.2803 | 0.6393 | 1.67 | 20.40 | −99.0000 |
| S10 | aspheric | −6.2509 | 0.1100 | | | −1.0126 |
| S11 | aspheric | −3.8920 | 0.2500 | 1.54 | 55.70 | −26.9805 |
| S12 | aspheric | −268.3135 | 1.7238 | | | 99.0000 |
| S13 | spherical | infinite | 0.2100 | 1.52 | 64.20 | |
| S14 | spherical | infinite | 0.2181 | | | |
| S15 | spherical | infinite | | | | |

In Example 1, the object-side surfaces and the image-side surfaces of the first to sixth lenses E1-E6 are aspheric surfaces, and the surface type of each aspheric lens may be defined using, but not limited to, the following formula:

$$x = \frac{ch^2}{1 + \sqrt{1 - (k+1)c^2h^2}} + \sum Aih^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 2 above); k is the conic coefficient; and Ai is the correction coefficient of an i-th order of the aspheric surface. Table 3 below shows the high-order coefficients A4, A6, A8, A10, A12, A14, A16, A18, A20, A22, A24, A26, A28 and A30 applicable to the aspheric surfaces S1-S12 in Example 1.

TABLE 3

| surface number | A4 | A6 | A8 | A10 | A12 | A14 | A16 |
|---|---|---|---|---|---|---|---|
| S1 | −2.4929E−02 | −3.2792E−03 | −4.2229E−04 | −5.3862E−05 | −5.6440E−06 | −2.4458E−06 | 1.1436E−07 |
| S2 | −4.1997E−03 | 2.2857E−03 | −3.8619E−04 | 5.1923E−05 | −1.4669E−05 | −4.8981E−07 | −1.3440E−06 |
| S3 | 1.8228E−02 | 4.3690E−03 | −1.7359E−03 | 4.1138E−04 | −9.2384E−05 | 1.5420E−05 | −2.4939E−06 |
| S4 | 2.5605E−02 | 4.3884E−03 | −1.0961E−03 | 1.8254E−04 | −3.1900E−05 | 4.0594E−06 | −1.7641E−06 |
| S5 | 1.6929E−02 | 1.2076E−02 | −4.3076E−04 | 4.4274E−04 | 5.1470E−05 | 5.8460E−06 | 6.5985E−06 |
| S6 | −4.9379E−03 | 9.8957E−03 | −3.3053E−04 | 4.6345E−04 | 1.0017E−04 | 3.1071E−05 | 8.1653E−06 |

TABLE 3-continued

| | | | | | | | |
|---|---|---|---|---|---|---|---|
| S7 | −8.4319E−02 | 5.7348E−03 | −4.7219E−03 | 6.9423E−05 | 9.3249E−05 | 1.2633E−05 | 1.9786E−05 |
| S8 | −4.5078E−02 | 1.4920E−02 | −9.2066E−03 | 2.6861E−03 | 6.9939E−05 | −2.7884E−05 | 6.7677E−05 |
| S9 | −1.8392E−01 | 4.7637E−02 | −3.6900E−02 | 6.2967E−03 | 2.5608E−03 | −2.2640E−04 | 7.0678E−04 |
| S10 | −7.1017E−02 | 4.9122E−02 | −4.7630E−02 | 6.6452E−03 | 9.6391E−03 | −6.2367E−04 | 5.0896E−04 |
| S11 | −1.3721E−01 | 1.5745E−01 | −4.1089E−02 | 3.1471E−05 | 2.8441E−04 | 1.9582E−03 | −1.3659E−05 |
| S12 | −5.1936E−01 | 8.7453E−02 | 2.1697E−03 | −9.7298E−03 | −6.4331E−03 | 1.4001E−03 | 6.5360E−04 |

| surface number | A18 | A20 | A22 | A24 | A26 | A28 | A30 |
|---|---|---|---|---|---|---|---|
| S1 | −7.8202E−07 | 2.8596E−07 | −7.7615E−07 | −2.6554E−08 | −2.1903E−07 | 4.9173E−07 | −1.8794E−07 |
| S2 | −3.5825E−07 | −6.4762E−07 | −4.4956E−07 | 2.4364E−08 | 3.8863E−07 | 3.2011E−07 | −1.0437E−07 |
| S3 | 4.0478E−07 | −5.1411E−08 | 3.7241E−08 | 8.8917E−08 | −4.8036E−08 | 6.3395E−08 | −3.7301E−08 |
| S4 | 6.4685E−07 | −1.6749E−07 | 4.7441E−07 | −2.3249E−07 | 9.5022E−08 | −9.6642E−08 | 2.8390E−08 |
| S5 | −1.2631E−06 | 2.1721E−06 | −1.1086E−06 | 9.9314E−07 | −4.1840E−07 | 7.1642E−07 | −3.3399E−07 |
| S6 | 4.6727E−06 | 1.4480E−06 | 1.9539E−06 | 5.7079E−07 | 8.9152E−07 | −4.3747E−07 | 4.4092E−08 |
| S7 | 5.6137E−06 | 7.5198E−06 | −7.5206E−07 | 2.1692E−06 | −6.3613E−07 | 1.5460E−06 | 1.9136E−07 |
| S8 | 6.0222E−05 | 2.8677E−05 | 2.1899E−05 | 1.3689E−05 | 7.9874E−06 | 3.8819E−06 | 1.3823E−06 |
| S9 | 3.5641E−04 | 1.7266E−04 | −3.3045E−05 | −8.9808E−05 | −1.0030E−04 | −5.3274E−05 | −1.3855E−05 |
| S10 | 6.8062E−06 | −6.4343E−04 | −1.4422E−03 | −6.8932E−04 | −5.5022E−04 | −3.3387E−04 | −1.3619E−05 |
| S11 | 7.7735E−04 | 5.2689E−04 | 3.3272E−04 | 1.0184E−03 | 1.6943E−04 | 7.5189E−05 | 1.9698E−04 |
| S12 | 6.1177E−04 | 2.8141E−04 | 5.2944E−04 | 9.1316E−04 | 5.8283E−04 | 2.8227E−04 | 6.9889E−05 |

Figure 5:
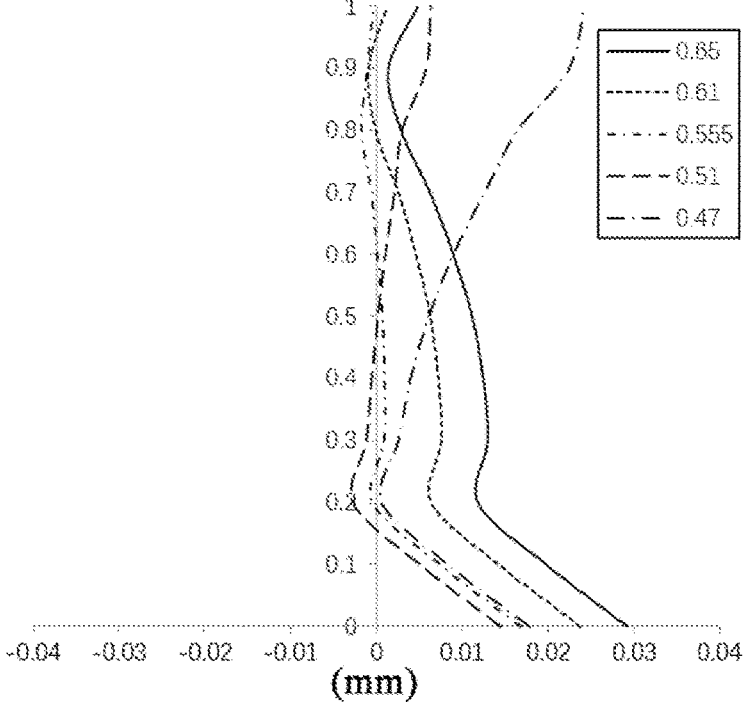
FIGS. 5-8 respectively illustrate a longitudinal aberration curve, an astigmatic curve, a distortion curve and a lateral color curve of Example 1 of the present disclosure.
Figure 6:
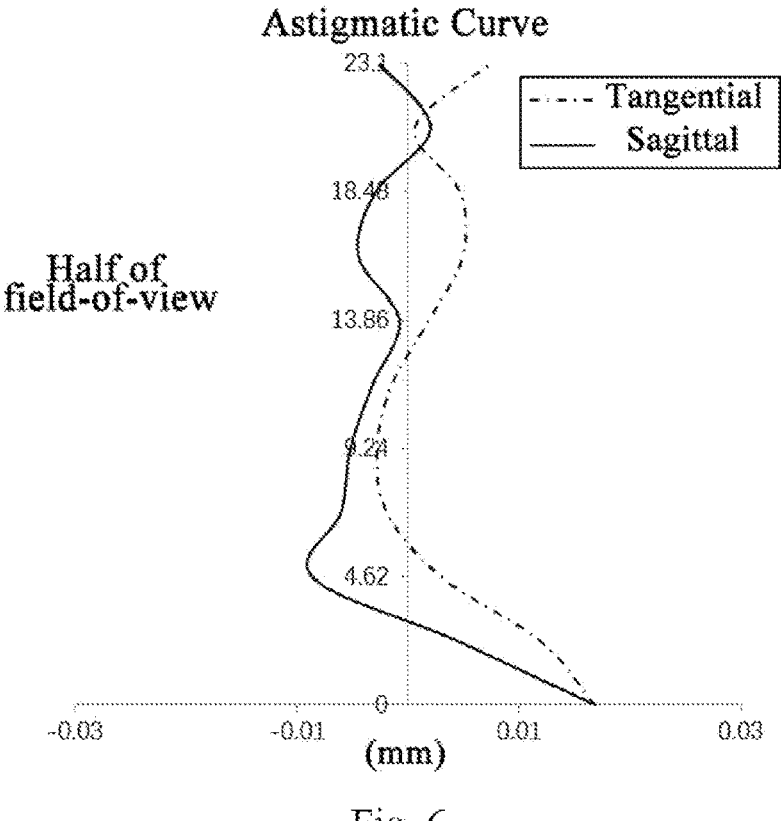
Figure 7:
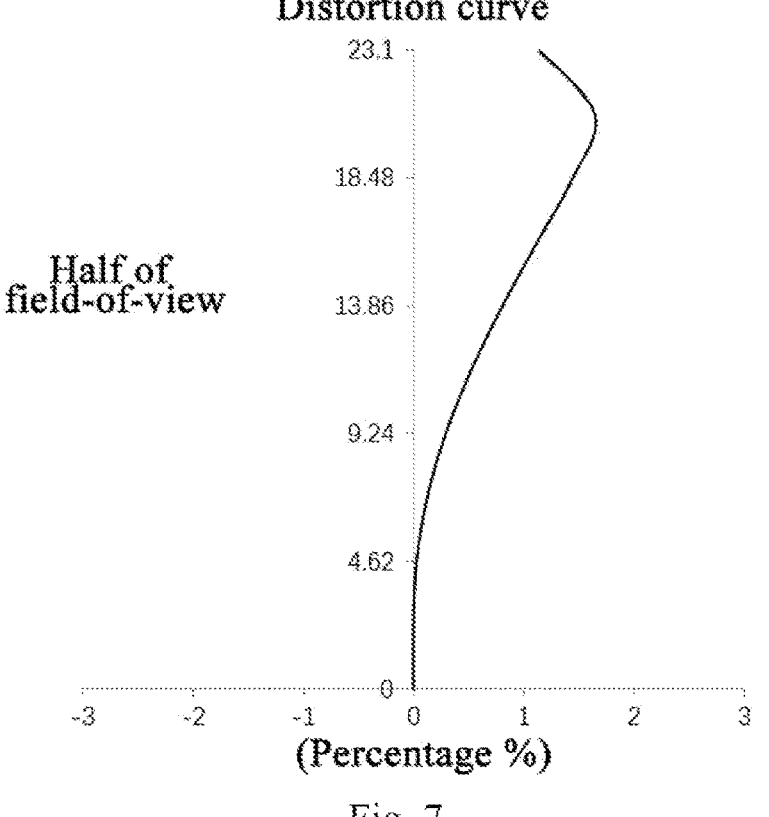
Figure 8:
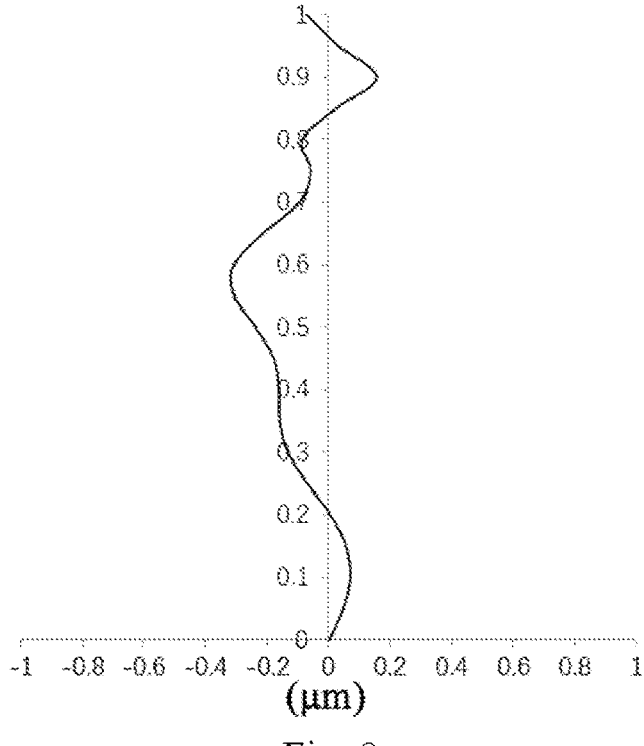

FIG. 5 illustrates a longitudinal aberration curve of the optical lens assembly in Example 1, representing deviations of focal points of light of different wavelengths converged after passing through the optical lens assembly. FIG. 6 illustrates an astigmatic curve of the optical lens assembly in Example 1, representing a curvature of a tangential image plane and a curvature of a sagittal image plane. FIG. 7 illustrates a distortion curve of the optical lens assembly in Example 1, representing amounts of distortion corresponding to different fields-of-view. FIG. 8 illustrates a lateral color curve of the optical lens assembly in Example 1, representing deviations of different image heights on an image plane after light passes through the optical lens assembly.

It can be seen from FIGS. 5-8 that the optical lens assembly given in Example 1 can achieve a good imaging quality.

Example 2

Figure 9:
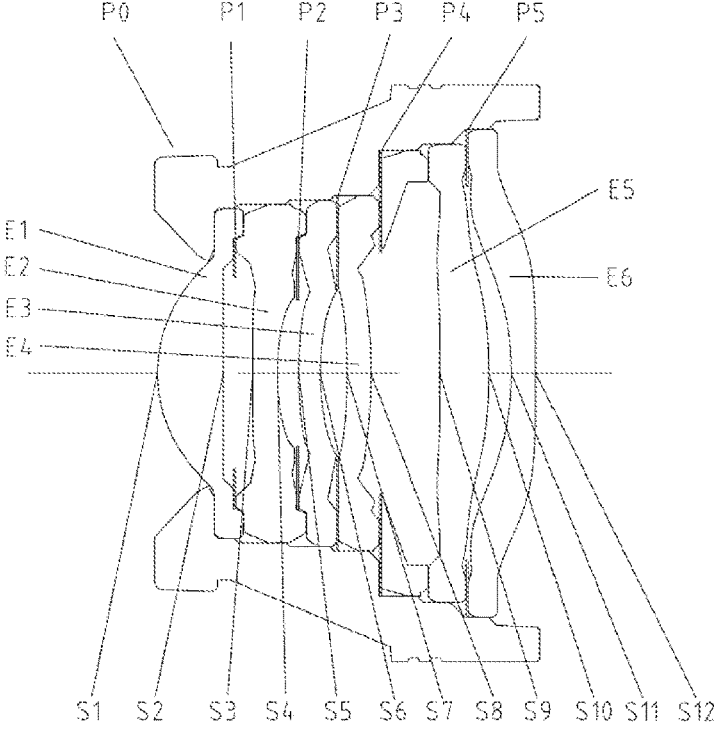
FIG. 9 is a schematic structural diagram of an optical lens assembly in a first state of Example 2 of the present disclosure.
Figure 10:
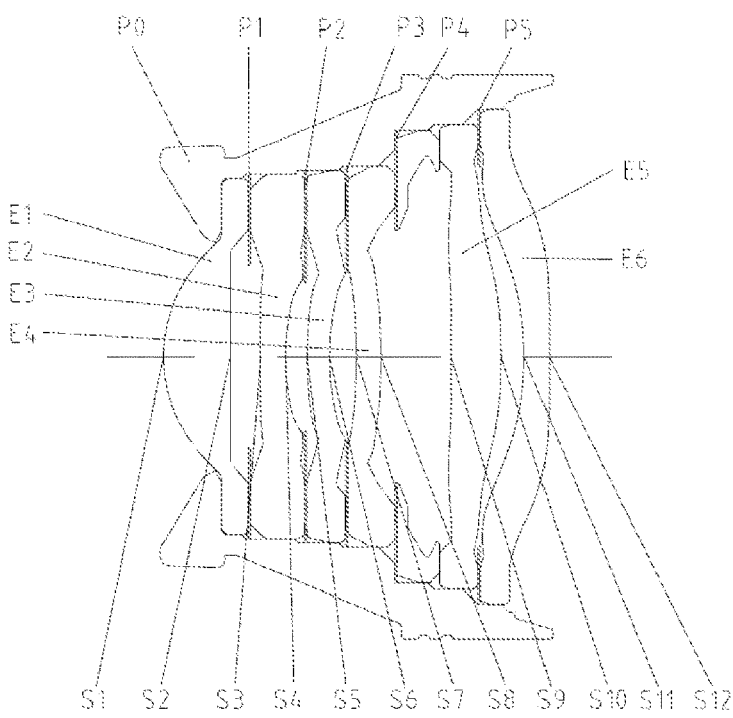
FIG. 10 is a schematic structural diagram of the optical lens assembly in a second state of Example 2 of the present disclosure.
Figure 11:
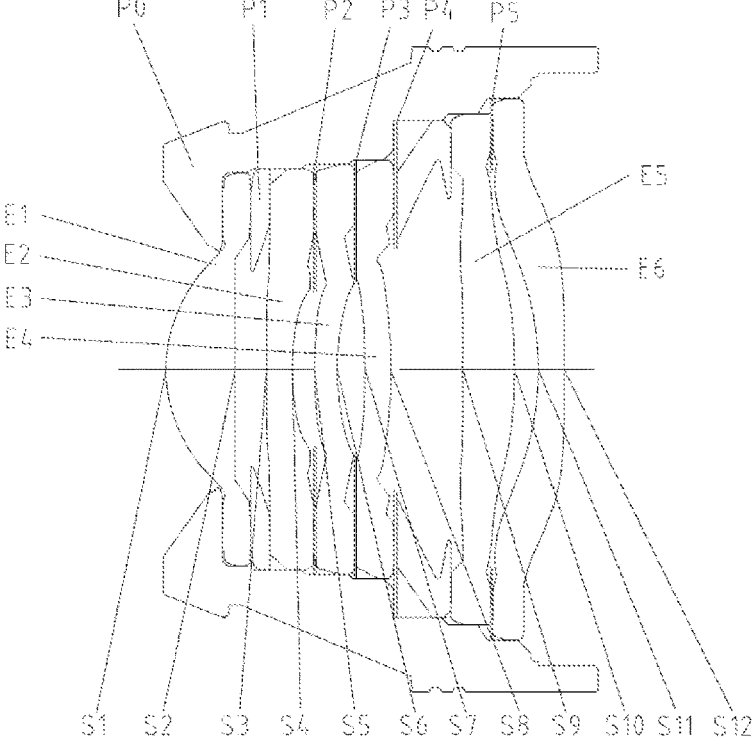
FIG. 11 is a schematic structural diagram of the optical lens assembly in a third state of Example 2 of the present disclosure.

As shown in FIGS. 9-15, an optical lens assembly in Example 2 is described. FIG. 9 is a schematic structural diagram of the optical lens assembly in Example 2 in a first state, FIG. 10 is a schematic structural diagram of the optical lens assembly in Example 2 in a second state, and FIG. 11 is a schematic structural diagram of the optical lens assembly in Example 2 in a third state.

As shown in FIGS. 9-11, the optical lens assembly includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5 and a sixth lens E6 that are sequentially disposed in the lens barrel P0 along the optical axis of the lens barrel P0 from an object side to an image side.

As shown in FIG. 9, in the first state, on the image side of the fourth spacer, the optical lens assembly further includes a spacer ring used for assisting the fourth spacer in bearing. An object-side surface and an image-side surface of the first spacer P1 are respectively at least partially abutted against an image-side surface S2 of the first lens and an object-side surface S3 of the second lens, and an outer periphery of the first spacer P1 is abutted against the first lens E1. An object-side surface and an image-side surface of the second spacer P2 are respectively at least partially abutted against an image-side surface S4 of the second lens and an object-side surface S5 of the third lens, and an outer periphery of the second spacer P2 is abutted against the second lens E2. An object-side surface and an image-side surface of the third spacer P3 are respectively at least partially abutted against an image-side surface S6 of the third lens and an object-side surface S7 of the fourth lens, and an outer periphery of the third spacer P3 is abutted against an inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

As shown in FIG. 10, in the second state, on the image side of the fourth spacer, the optical lens assembly further includes a spacer ring used for assisting the fourth spacer in bearing. An object-side surface and an image-side surface of the first spacer P1 are respectively at least partially abutted against an image-side surface S2 of the first lens and an object-side surface S3 of the second lens, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface S5 of the third lens, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

As shown in FIG. 11, in the third state, on the image side of the fourth spacer, the optical lens assembly further includes a spacer ring used for assisting the fourth spacer in bearing. An object-side surface and an image-side surface of the first spacer P1 are respectively at least partially abutted against an image-side surface S2 of the first lens and an object-side surface S3 of the second lens, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface S5 of the third lens, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

In summary, the parameters of the optical lens assembly in Example 2 in the first state 2-1, the second state 2-2 and the third state 2-3 are as shown in Table 4.

TABLE 4

| | state | | |
|---|---|---|---|
| parameter | 2-1 | 2-2 | 2-3 |
| d1s(mm) | 2.39 | 2.24 | 2.29 |
| d1m(mm) | 2.39 | 2.24 | 3.46 |
| d2s(mm) | 1.83 | 1.83 | 1.84 |
| d3s(mm) | 2.08 | 2.08 | 2.08 |
| d3m(mm) | 2.08 | 2.08 | 2.08 |
| d4s(mm) | 2.99 | 3.11 | 2.87 |
| D4m(mm) | 5.56 | 5.56 | 5.89 |
| d5s(mm) | 4.66 | 4.66 | 4.66 |
| D5s(mm) | 6.09 | 6.09 | 6.42 |
| D5m(mm) | 6.09 | 6.09 | 6.42 |
| d0s(mm) | 4.09 | 4.70 | 4.44 |
| d0m(mm) | 6.33 | 6.69 | 7.02 |
| D0s(mm) | 5.40 | 5.15 | 5.35 |
| D0m(mm) | 7.20 | 6.95 | 7.64 |
| L(mm) | 4.78 | 4.78 | 5.14 |
| EP01(mm) | 0.99 | 1.07 | 1.04 |
| CP1(mm) | 0.02 | 0.02 | 0.23 |
| EP12(mm) | 0.75 | 0.66 | 0.51 |
| EP23(mm) | 0.47 | 0.48 | 0.46 |
| EP34(mm) | 0.52 | 0.58 | 0.45 |
| EP45(mm) | 1.06 | 0.99 | 1.11 |

In Example 2, an object-side surface S1 of the first lens is a convex surface, and the image-side surface S2 of the first lens is a concave surface. The object-side surface S3 of the second lens is a convex surface, and the image-side surface S4 of the second lens is a concave surface. The object-side surface S5 of the third lens is a convex surface, and the image-side surface S6 of the third lens is a concave surface. The object-side surface S7 of the fourth lens is a concave surface, and the image-side surface S8 of the fourth lens is a convex surface. An object-side surface S9 of the fifth lens is a convex surface, and the image-side surface S10 of the fifth lens is a convex surface. The object-side surface S11 of the sixth lens is a concave surface, and an image-side surface S12 of the sixth lens is a concave surface.

In Example 2, an effective focal length f of the optical lens assembly is 6.80 mm, an effective focal length f1 of the first lens is 3.24 mm, an effective focal length f2 of the second lens is −4.96, an effective focal length f3 of the third lens is −14.90 mm, an effective focal length f4 of the fourth lens is 50.00 mm, an effective focal length f5 of the fifth lens is 7.93 mm, an effective focal length f6 of the sixth lens is −6.29 mm, a maximal field-of-view FOV of the optical lens assembly is 52.6°, and an F-number Fno of the optical lens assembly is 2.60.

Table 5 is a table showing basic structural parameters of the optical lens assembly in Example 2. Here, the units of a radius of curvature and a thickness/distance are millimeters (mm).

TABLE 5

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7561 | 0.8195 | 1.55 | 56.10 | −0.0294 |
| S2 | aspheric | 177.2474 | 0.3701 | | | −99.0000 |
| S3 | aspheric | 212.8920 | 0.2963 | 1.67 | 20.40 | 99.0000 |
| S4 | aspheric | 3.2509 | 0.2657 | | | 2.3761 |
| S5 | aspheric | 4.9305 | 0.2680 | 1.55 | 56.10 | 0.4511 |
| S6 | aspheric | 3.0109 | 0.3305 | | | 1.0810 |
| S7 | aspheric | −20.2030 | 0.3000 | 1.55 | 56.10 | −99.0000 |
| S8 | aspheric | −11.6704 | 0.8559 | | | 67.6819 |
| S9 | aspheric | 26.7318 | 0.6125 | 1.67 | 20.40 | −13.4294 |
| S10 | aspheric | −6.5252 | 0.2807 | | | −8.2683 |
| S11 | aspheric | −3.5252 | 0.3000 | 1.54 | 55.70 | −12.0067 |
| S12 | aspheric | 80.6538 | 1.2728 | | | 89.5564 |
| S13 | spherical | infinite | 0.2100 | 1.52 | 64.20 | |
| S14 | spherical | infinite | 0.2181 | | | |
| S15 | spherical | infinite | | | | |

Table 6 shows the high-order coefficients applicable to the aspheric surfaces in Example 2. Here, the surface type of each aspheric surface may be defined using the formula (1) given in Example 1.

TABLE 6

| surface number | A4 | A6 | A8 | A10 | A12 | A14 | A16 |
|---|---|---|---|---|---|---|---|
| S1 | −2.5698E−02 | −7.0306E−03 | −2.1901E−03 | −7.6975E−04 | −3.0890E−04 | −1.4634E−04 | −6.5268E−05 |
| S2 | −5.9931E−03 | 1.3333E−04 | −1.3686E−03 | −2.5941E−04 | −1.6800E−04 | −3.9735E−05 | −9.9175E−06 |
| S3 | 1.9862E−02 | 5.3207E−03 | −1.1015E−03 | 1.3967E−04 | −6.1457E−05 | −9.4553E−06 | −1.0166E−05 |

TABLE 6-continued

| S4 | 3.0161E-02 | 8.7680E-03 | -4.2270E-05 | 1.4446E-04 | -3.0106E-05 | 1.4217E-06 | 3.1288E-06 |
|---|---|---|---|---|---|---|---|
| S5 | 1.2849E-02 | 1.3437E-02 | -2.1205E-04 | 1.1988E-04 | -8.8765E-05 | -1.8722E-05 | 6.0363E-06 |
| S6 | -4.5749E-03 | 1.0024E-02 | -5.9418E-04 | 2.5962E-04 | -6.2209E-05 | -1.0581E-05 | -1.2220E-05 |
| S7 | -6.1052E-02 | 8.6148E-03 | -2.5571E-03 | -9.6417E-05 | -2.6885E-05 | 8.8995E-06 | -3.3577E-05 |
| S8 | -3.8100E-02 | 1.2572E-02 | -1.0117E-02 | -7.1749E-04 | -2.5156E-04 | -1.8150E-04 | -9.3551E-05 |
| S9 | -1.2067E-01 | 6.6183E-02 | -3.8253E-02 | 6.9297E-03 | 1.6820E-03 | -1.5128E-03 | 6.0170E-04 |
| S10 | 7.6733E-03 | 6.4245E-02 | -4.7745E-02 | 3.8695E-03 | 7.2356E-03 | -3.4094E-03 | 6.9037E-04 |
| S11 | -1.2738E-01 | 1.7544E-01 | -3.4810E-02 | -8.5256E-03 | 4.4692E-03 | -2.5559E-04 | 1.0143E-03 |
| S12 | -6.5640E-01 | 1.2331E-01 | 1.5977E-02 | -5.0547E-03 | -5.9917E-03 | -9.2037E-04 | 2.4099E-03 |

| surface number | A18 | A20 | A22 | A24 | A26 | A28 | A30 |
|---|---|---|---|---|---|---|---|
| S1 | -3.1947E-05 | -1.3882E-05 | -7.4570E-06 | -2.8768E-06 | -2.3131E-06 | -6.6691E-07 | -8.3191E-07 |
| S2 | 4.1668E-06 | 6.7527E-06 | 7.9654E-06 | 5.6454E-06 | 4.1190E-06 | 1.0802E-06 | 1.1810E-07 |
| S3 | -9.3907E-06 | -5.8367E-06 | -4.4403E-06 | -2.9324E-06 | -2.6900E-06 | -1.4651E-06 | -8.4085E-07 |
| S4 | 5.6635E-06 | 2.6630E-06 | 2.9884E-06 | 1.5709E-06 | 1.6086E-06 | 6.2464E-07 | 8.4484E-07 |
| S5 | -9.2531E-06 | -1.0289E-05 | -1.4688E-05 | -8.5854E-06 | -6.9535E-06 | -2.0935E-06 | -2.2367E-06 |
| S6 | 6.8044E-06 | -1.4660E-06 | 4.0954E-06 | -1.0284E-06 | 6.5076E-07 | -1.8903E-06 | 8.1437E-07 |
| S7 | 3.8593E-06 | -7.9747E-06 | 5.0991E-06 | -3.0063E-06 | 1.4103E-06 | -3.8321E-06 | 1.7174E-06 |
| S8 | 2.0004E-05 | 1.4643E-06 | 1.1086E-05 | -1.7050E-06 | 4.1518E-06 | -2.0285E-06 | 3.8412E-06 |
| S9 | 1.5753E-04 | 7.5450E-05 | -6.3557E-06 | 7.5921E-05 | -1.2461E-05 | -5.0932E-07 | -8.4892E-06 |
| S10 | -1.0727E-04 | -2.4946E-04 | -6.4593E-04 | 2.7892E-04 | 5.5943E-05 | -4.0589E-05 | -4.6375E-06 |
| S11 | -1.4289E-03 | 7.5521E-04 | -2.2372E-04 | 9.0187E-04 | -1.8373E-04 | -2.8023E-04 | -8.0371E-05 |
| S12 | 2.9177E-04 | 6.4784E-04 | -4.1158E-04 | 3.2328E-04 | 1.2781E-04 | 1.2125E-04 | 2.7290E-06 |

Figure 12:
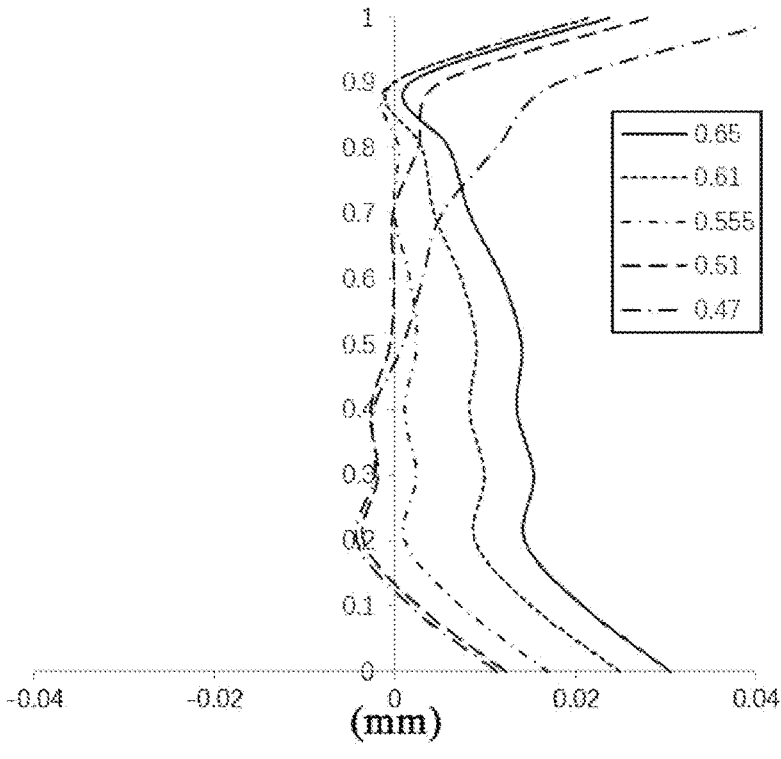
FIGS. 12-15 respectively illustrate a longitudinal aberration curve, an astigmatic curve, a distortion curve and a lateral color curve of Example 2 of the present disclosure.
Figure 13:
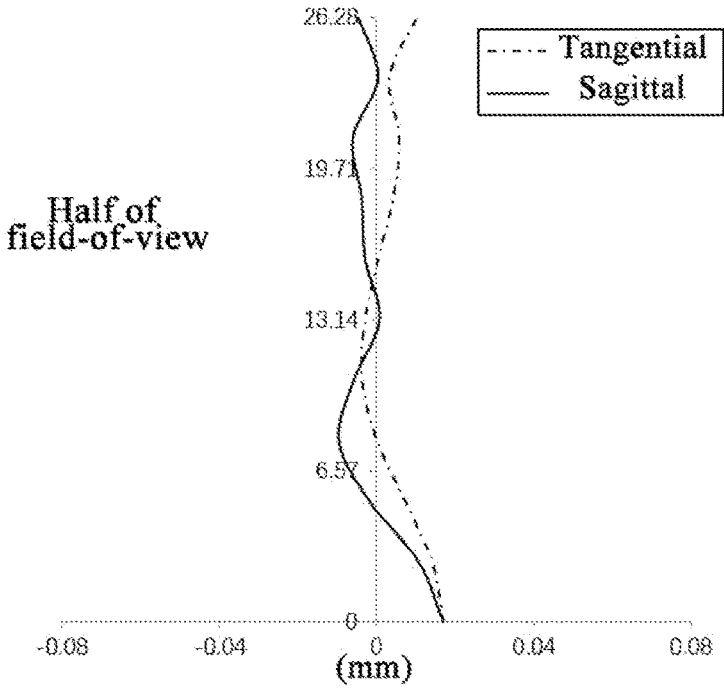
Figure 14:
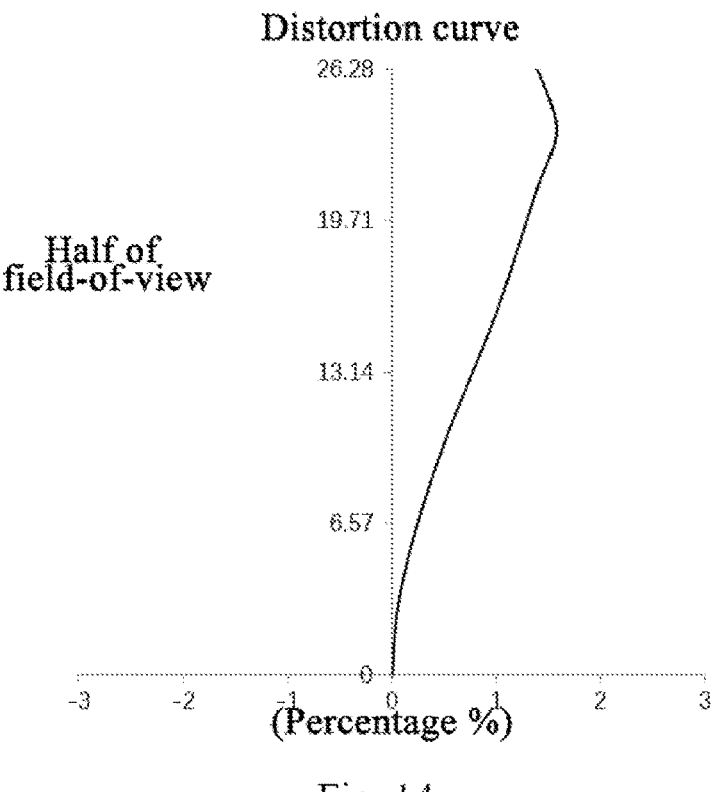
Figure 15:
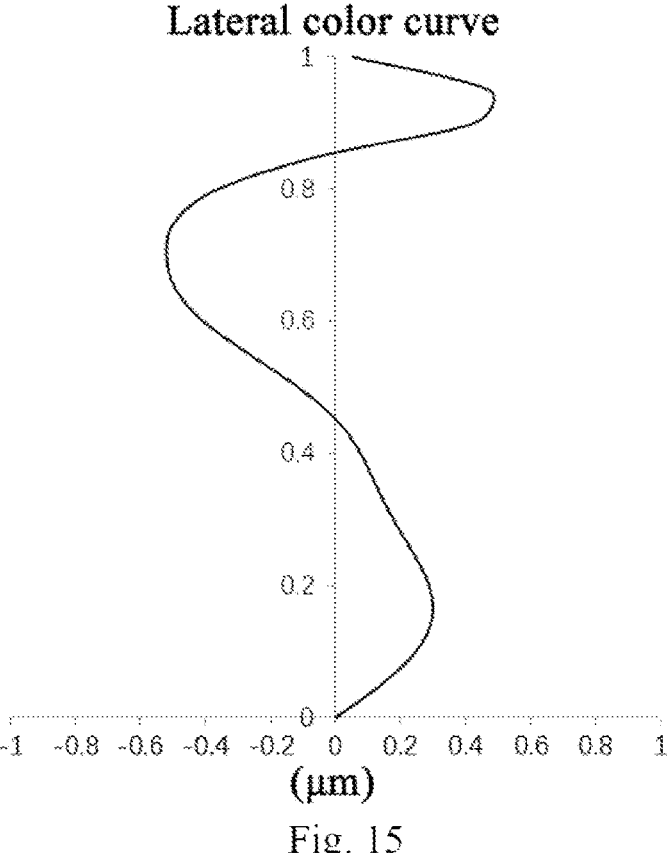

FIG. 12 illustrates a longitudinal aberration curve of the optical lens assembly in Example 2, representing deviations of focal points of light of different wavelengths converged after passing through the optical lens assembly. FIG. 13 illustrates an astigmatic curve of the optical lens assembly in Example 2, representing a curvature of a tangential image plane and a curvature of a sagittal image plane. FIG. 14 illustrates a distortion curve of the optical lens assembly in Example 2, representing amounts of distortion corresponding to different fields-of-view. FIG. 15 illustrates a lateral color curve of the optical lens assembly in Example 2, representing deviations of different image heights on an image plane after light passes through the optical lens assembly.

It can be seen from FIGS. 12-15 that the optical lens assembly given in Example 2 can achieve a good imaging quality.

Example 3

Figure 16:
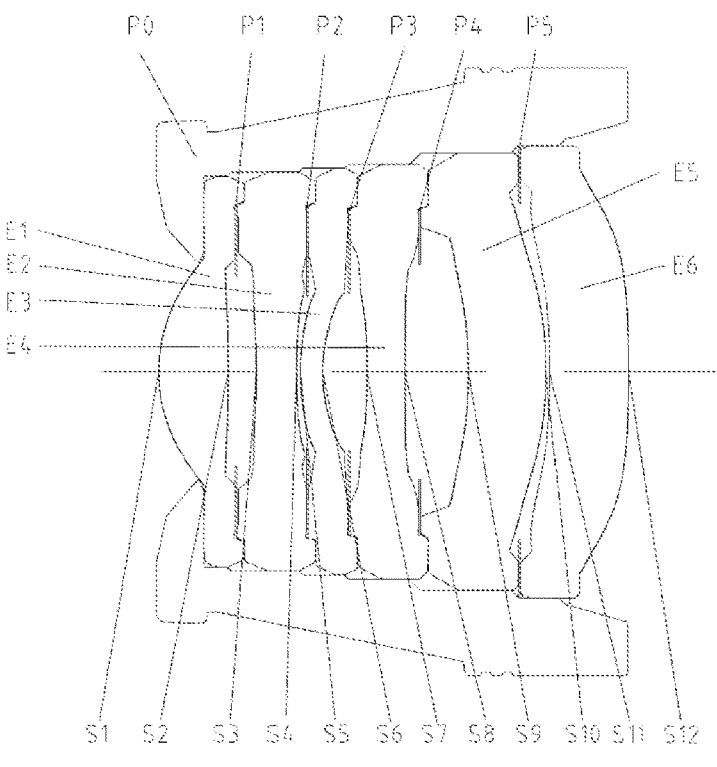
FIG. 16 is a schematic structural diagram of an optical lens assembly in a first state of Example 3 of the present disclosure.
Figure 17:
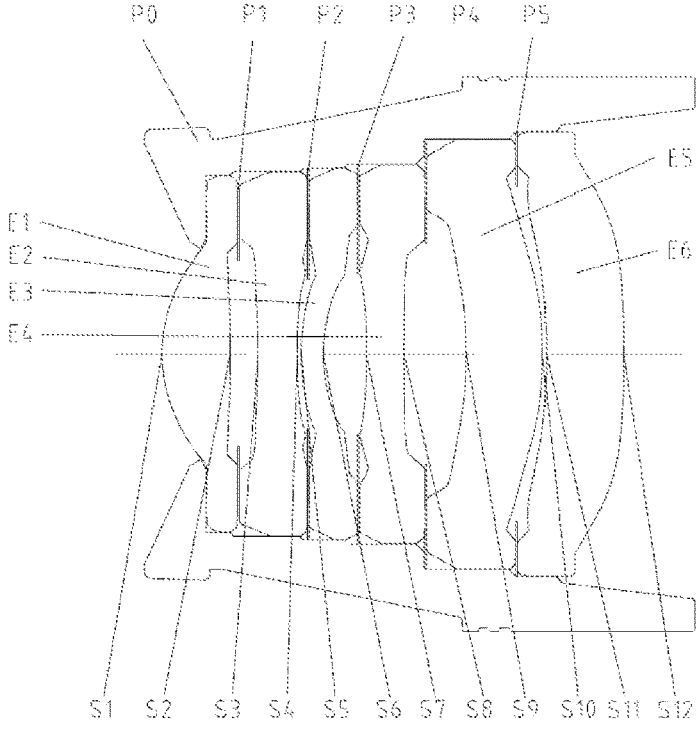
FIG. 17 is a schematic structural diagram of the optical lens assembly in a second state of Example 3 of the present disclosure.
Figure 18:
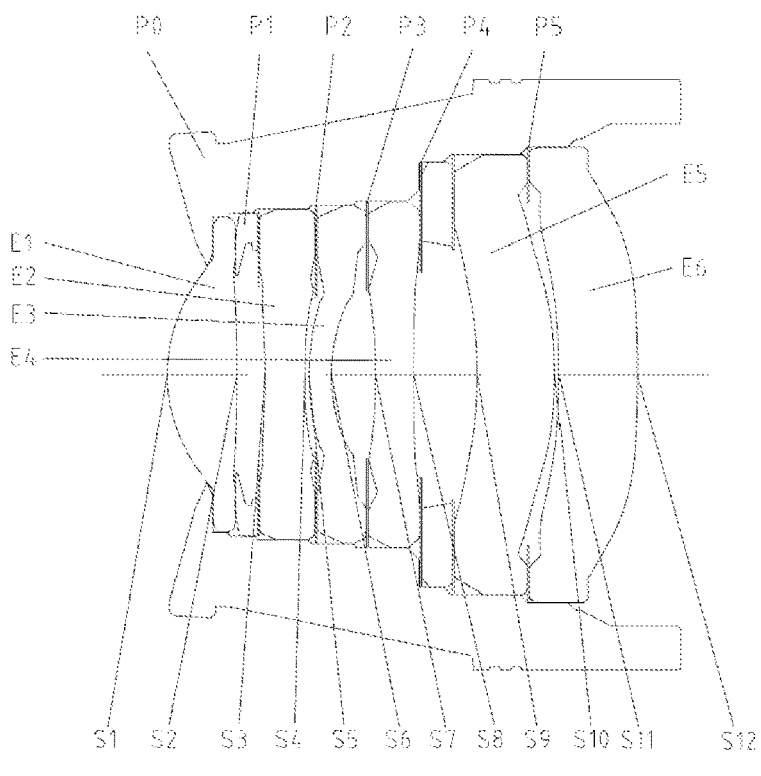
FIG. 18 is a schematic structural diagram of the optical lens assembly in a third state of Example 3 of the present disclosure.

As shown in FIGS. 16-22, an optical lens assembly in Example 3 is described. FIG. 16 is a schematic structural diagram of the optical lens assembly in Example 3 in a first state, FIG. 17 is a schematic structural diagram of the optical lens assembly in Example 3 in a second state, and FIG. 18 is a schematic structural diagram of the optical lens assembly in Example 3 in a third state.

As shown in FIGS. 16-18, the optical lens assembly includes a lens barrel P0, and a first lens E1, a first spacer P1, a second lens E2, a second spacer P2, a third lens E3, a third spacer P3, a fourth lens E4, a fourth spacer P4, a fifth lens E5, a fifth spacer P5 and a sixth lens E6, that are sequentially disposed in the lens barrel P0 along the optical axis of the lens barrel P0 from an object side to an image side.

As shown in FIG. 16, for the optical lens assembly in the first state, an object-side surface and an image-side surface of the first spacer P1 are respectively at least partially abutted against an image-side surface S2 of the first lens and an object-side surface S3 of the second lens, and an outer periphery of the first spacer P1 is abutted against the first lens E1. An object-side surface and an image-side surface of the second spacer P2 are respectively at least partially abutted against an image-side surface S4 of the second lens and an object-side surface S5 of the third lens, and an outer periphery of the second spacer P2 is abutted against the second lens E2. An object-side surface and an image-side surface of the third spacer P3 are respectively at least partially abutted against an image-side surface S6 of the third lens and an object-side surface S7 of the fourth lens, and an outer periphery of the third spacer P3 is abutted against the second third E3. An object-side surface and an image-side surface of the fourth spacer P4 are respectively abutted against an image-side surface S8 of the fourth lens and an object-side surface S9 of the fifth lens, and an outer periphery of the fourth spacer P4 is abutted against the fourth lens E4. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against an inner-wall surface the lens barrel P0.

As shown in FIG. 17, for the optical lens assembly in the second state, an object-side surface and an image-side surface of the first spacer P1 are respectively at least partially abutted against an image-side surface S2 of the first lens and an object-side surface S3 of the second lens, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface S5 of the third lens, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface S9 of the fifth lens, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

As shown in FIG. 18, for the optical lens assembly in the third state, the optical lens assembly further includes a septum, used for assisting the first spacer P1 in bearing, on the image side of the first spacer P1, and further includes a spacer ring and septum, used for assisting the fourth spacer P4 in bearing, on the image side of the fourth spacer P4. An object-side surface and an image-side surface of the first spacer P1 are respectively at least partially abutted against an image-side surface S2 of the first lens and an object-side surface of the septum, and an outer periphery of the first spacer P1 is abutted against an inner-wall surface the lens barrel P0. An object-side surface and an image-side surface of the second spacer P2 are respectively at least partially abutted against an image-side surface S4 of the second lens and an object-side surface S5 of the third lens, and an outer periphery of the second spacer P2 is abutted against the inner-wall surface the lens barrel P0. An object-side surface and an image-side surface of the third spacer P3 are respectively at least partially abutted against an image-side surface S6 of the third lens and an object-side surface S7 of the fourth lens, and an outer periphery of the third spacer P3 is abutted against the inner-wall surface the lens barrel P0. An object-side surface and an image-side surface of the fourth spacer P4 are respectively abutted against an image-side surface S8 of the fourth lens and an object-side surface of the spacer ring, and an outer periphery of the fourth spacer P4 is abutted against the inner-wall surface the lens barrel P0. An object-side surface and an image-side surface of the fifth spacer P5 are respectively at least partially abutted against an image-side surface S10 of the fifth lens and an object-side surface S11 of the sixth lens, and an outer periphery of the fifth spacer P5 is abutted against the inner-wall surface the lens barrel P0.

In summary, the parameters of the optical lens assembly in Example 3 in the first state 3-1, the second state 3-2 and the third state 3-3 are as shown in Table 7.

TABLE 7

| parameter | state | | |
| --- | --- | --- | --- |
| | 3-1 | 3-2 | 3-3 |
| d1s(mm) | 2.46 | 2.46 | 2.54 |
| d1m(mm) | 2.46 | 2.46 | 3.20 |
| d2s(mm) | 1.97 | 1.97 | 1.97 |
| d3s(mm) | 2.05 | 2.15 | 2.15 |
| d3m(mm) | 2.05 | 2.15 | 2.15 |
| d4s(mm) | 2.79 | 2.94 | 2.64 |
| D4m(mm) | 4.24 | 5.69 | 5.49 |
| d5s(mm) | 4.37 | 4.42 | 4.42 |
| D5s(mm) | 5.88 | 5.88 | 5.88 |
| D5m(mm) | 5.88 | 5.88 | 5.88 |
| d0s(mm) | 5.00 | 5.55 | 5.87 |
| d0m(mm) | 6.48 | 6.48 | 6.48 |
| D0s(mm) | 6.50 | 5.95 | 6.23 |
| D0m(mm) | 7.90 | 7.35 | 7.63 |
| L(mm) | 6.09 | 7.23 | 6.60 |
| EP01(mm) | 1.02 | 1.22 | 0.85 |
| CP1(mm) | 0.02 | 0.02 | 0.30 |
| EP12(mm) | 0.90 | 0.89 | 0.71 |
| EP23(mm) | 0.52 | 0.64 | 0.64 |
| EP34(mm) | 0.89 | 0.87 | 0.67 |
| EP45(mm) | 1.27 | 1.17 | 1.37 |

In Example 1, an object-side surface S1 of the first lens is a convex surface, and the image-side surface S2 of the first lens is a convex surface. The object-side surface S3 of the second lens is a concave surface, and the image-side surface S4 of the second lens is a concave surface. The object-side surface S5 of the third lens is a convex surface, and the image-side surface S6 of the third lens is a concave surface. The object-side surface S7 of the fourth lens is a concave surface, and the image-side surface S8 of the fourth lens is a concave surface. The object-side surface S9 of the fifth lens is a concave surface, and the image-side surface S10 of the fifth lens is a convex surface. The object-side surface S11 of the sixth lens is a concave surface, and an image-side surface S12 of the sixth lens is a convex surface.

In Example 1, an effective focal length f of the optical lens assembly is 8.34 mm, an effective focal length f1 of the first lens is 3.46 mm, an effective focal length f2 of the second lens is −7.25, an effective focal length f3 of the third lens is −13.43 mm, an effective focal length f4 of the fourth lens is −19.05 mm, an effective focal length f5 of the fifth lens is −52.87 mm, an effective focal length f6 of the sixth lens is 50.00 mm, a maximal field-of-view FOV of the optical lens assembly is 43.9°, and an F-number Fno of the optical lens assembly is 3.02.

Table 8 is a table showing basic structural parameters of the optical lens assembly in Example 3. Here, the units of a radius of curvature and a thickness/distance are millimeters (mm).

TABLE 8

| surface number | surface type | radius of curvature | thickness | material | | conic coefficient |
| --- | --- | --- | --- | --- | --- | --- |
| | | | | refractive index | abbe number | |
| OBJ | spherical | infinite | infinite | | | |
| S1 | aspheric | 2.0378 | 0.8997 | 1.55 | 56.10 | 0.0058 |
| S2 | aspheric | −21.8706 | 0.3661 | | | −99.0000 |
| S3 | aspheric | −8.5613 | 0.5097 | 1.67 | 20.40 | −99.0000 |
| S4 | aspheric | 11.3488 | 0.0500 | | | 2.9229 |
| S5 | aspheric | 3.1476 | 0.2900 | 1.55 | 56.10 | −2.3669 |
| S6 | aspheric | 2.1306 | 0.5689 | | | −0.1368 |
| S7 | aspheric | −42.8392 | 0.4938 | 1.55 | 56.10 | −99.0000 |
| S8 | aspheric | 13.7882 | 0.8220 | | | 78.9045 |
| S9 | aspheric | −7.7853 | 1.0000 | 1.67 | 20.40 | 0.3962 |
| S10 | aspheric | −10.5063 | 0.0500 | | | 9.3277 |
| S11 | aspheric | −165.9589 | 1.0155 | 1.54 | 55.70 | 99.0000 |
| S12 | aspheric | −23.1438 | 1.5063 | | | 77.0379 |
| S13 | spherical | infinite | 0.2100 | 1.52 | 64.20 | |
| S14 | spherical | infinite | 0.2181 | | | |
| S15 | spherical | infinite | | | | |

Table 9 shows the high-order coefficients applicable to the aspheric surfaces in Example 3. Here, the surface type of each aspheric surface may be defined using the formula (1) given in Example 1.

TABLE 9

| surface number | A4 | A6 | A8 | A10 | A12 | A14 | A16 |
|---|---|---|---|---|---|---|---|
| S1 | −2.2495E−02 | −2.9981E−03 | −7.3218E−04 | −2.2909E−04 | −8.0432E−05 | −3.1237E−05 | −9.4891E−06 |
| S2 | −1.5620E−02 | 2.2279E−03 | −1.6688E−03 | −6.1055E−05 | −8.1422E−05 | 1.2940E−05 | 1.2572E−05 |
| S3 | 1.0092E−02 | 4.2233E−03 | −9.2808E−04 | 1.5305E−04 | −4.5364E−05 | 8.1199E−06 | −5.5265E−07 |
| S4 | 2.4804E−02 | 1.9317E−03 | 2.9227E−04 | 3.1384E−05 | −6.5570E−05 | 1.3164E−05 | −2.3729E−06 |
| S5 | 1.0579E−02 | 5.2624E−03 | 1.8970E−03 | −3.0326E−04 | −1.3092E−04 | 5.3083E−05 | −4.3820E−06 |
| S6 | −1.1907E−02 | 8.3773E−03 | 1.7233E−03 | 1.0164E−04 | 1.0235E−05 | 3.2267E−05 | 5.8647E−06 |
| S7 | −6.4729E−02 | 8.2179E−03 | −7.1349E−04 | 3.7405E−05 | 7.8557E−06 | 2.4395E−05 | −2.1280E−06 |
| S8 | −4.8636E−02 | 1.9801E−02 | −5.4000E−03 | 6.0640E−06 | 1.3924E−04 | 7.2083E−05 | −9.3084E−06 |
| S9 | −1.4288E−01 | 3.7170E−03 | −3.2579E−02 | 1.9759E−02 | −2.1764E−03 | −2.8963E−03 | 1.3517E−03 |
| S10 | −2.7040E−01 | 1.2018E−01 | −6.6415E−02 | 1.3781E−02 | −3.7214E−03 | 5.3087E−03 | −1.6508E−03 |
| S11 | −3.4178E−01 | 1.8877E−01 | −5.0222E−02 | 4.7335E−03 | −9.7407E−03 | 5.6259E−03 | −3.4902E−03 |
| S12 | −4.3651E−01 | 4.7330E−02 | 2.5833E−02 | 3.9890E−03 | 1.6699E−03 | 6.4892E−04 | 1.0136E−04 |

| surface number | A18 | A20 | A22 | A24 | A26 | A28 | A30 |
|---|---|---|---|---|---|---|---|
| S1 | −3.1083E−06 | −8.7954E−07 | −2.9536E−07 | 5.9700E−08 | −7.0666E−09 | −4.3522E−07 | −3.7026E−07 |
| S2 | 7.5400E−06 | 4.2373E−06 | 9.8797E−07 | −1.0082E−07 | −6.9736E−07 | −6.3518E−07 | −6.9835E−07 |
| S3 | 1.2067E−07 | −2.6360E−07 | −1.0587E−07 | 2.5499E−08 | 1.7138E−07 | −9.4633E−08 | 1.3565E−08 |
| S4 | 5.7255E−07 | 5.6780E−07 | 6.4481E−08 | −2.4146E−07 | −3.2190E−07 | 3.0051E−07 | −6.1308E−08 |
| S5 | 1.4565E−06 | −6.0245E−07 | 4.4202E−07 | 5.6780E−07 | 2.7141E−07 | −8.8571E−08 | −2.1198E−07 |
| S6 | 1.3455E−06 | 1.0449E−07 | 8.6438E−07 | 1.4740E−07 | 1.5687E−07 | −6.8009E−11 | 1.8343E−07 |
| S7 | 3.9716E−06 | −2.1567E−06 | 1.3736E−06 | −5.3422E−07 | 1.2607E−06 | −9.3691E−07 | 1.9184E−07 |
| S8 | 2.3674E−06 | −1.5769E−06 | 5.6175E−07 | −8.2969E−07 | 9.1473E−06 | −1.2848E−07 | 8.2173E−08 |
| S9 | 1.6969E−03 | 4.3527E−05 | −8.0685E−04 | −6.3105E−04 | −1.2394E−04 | 3.8851E−05 | 1.6358E−05 |
| S10 | 1.6778E−03 | −1.1618E−03 | −1.4016E−05 | −7.6006E−04 | −1.9783E−04 | −8.6171E−05 | 4.9362E−05 |
| S11 | 2.3868E−03 | −7.9169E−04 | 1.2969E−03 | −4.5108E−05 | 4.6547E−04 | 1.6644E−04 | 1.4352E−04 |
| S12 | 3.0612E−04 | 1.8064E−04 | 1.8460E−04 | 1.5507E−04 | 9.1497E−05 | 5.4057E−05 | 1.2762E−05 |

Figure 19:
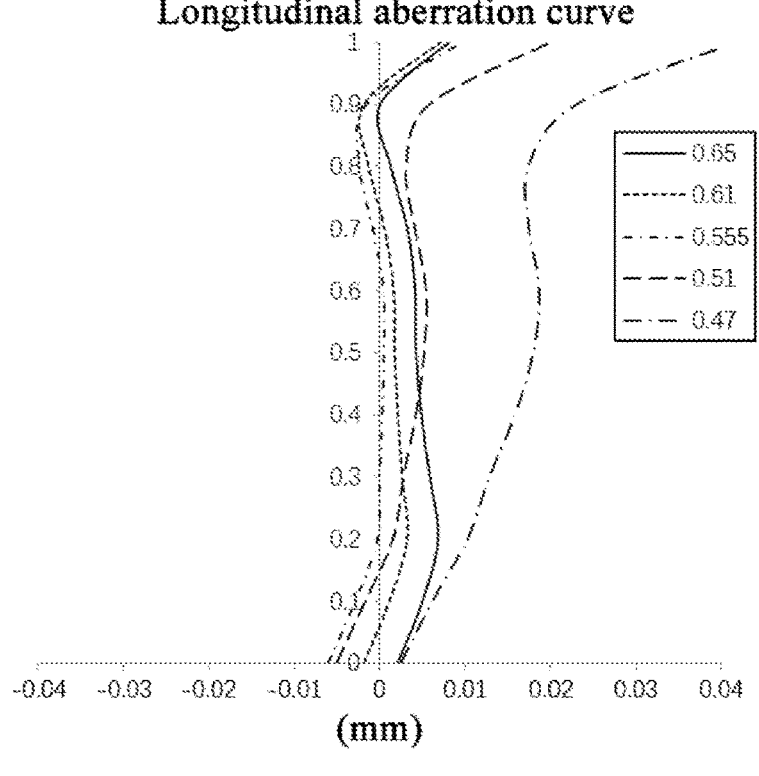
FIGS. 19-22 respectively illustrate a longitudinal aberration curve, an astigmatic curve, a distortion curve and a lateral color curve of Example 3 of the present disclosure.
Figure 20:
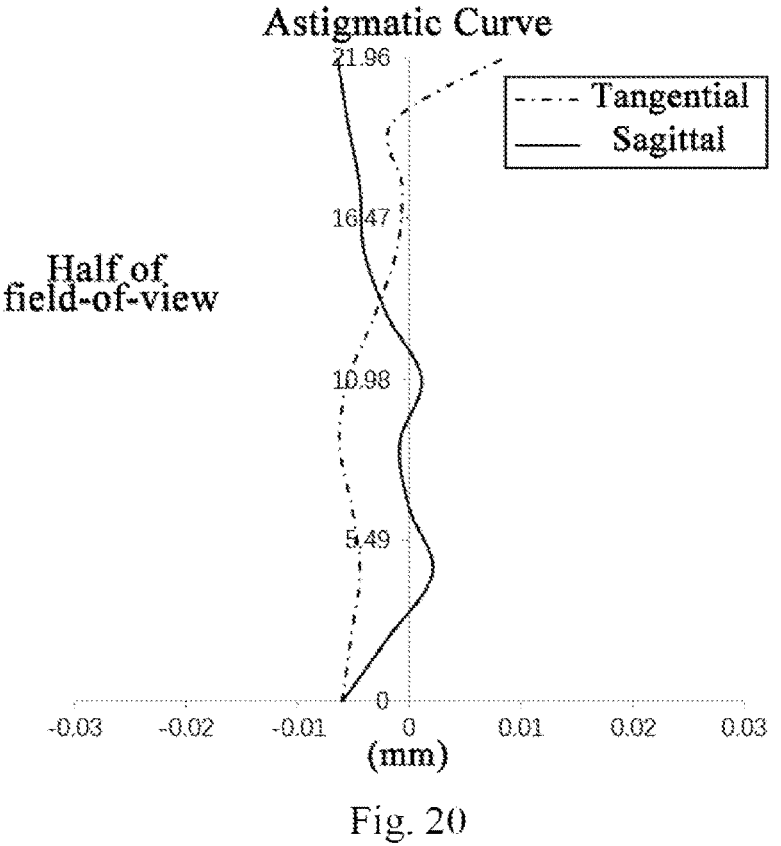
Figure 21:
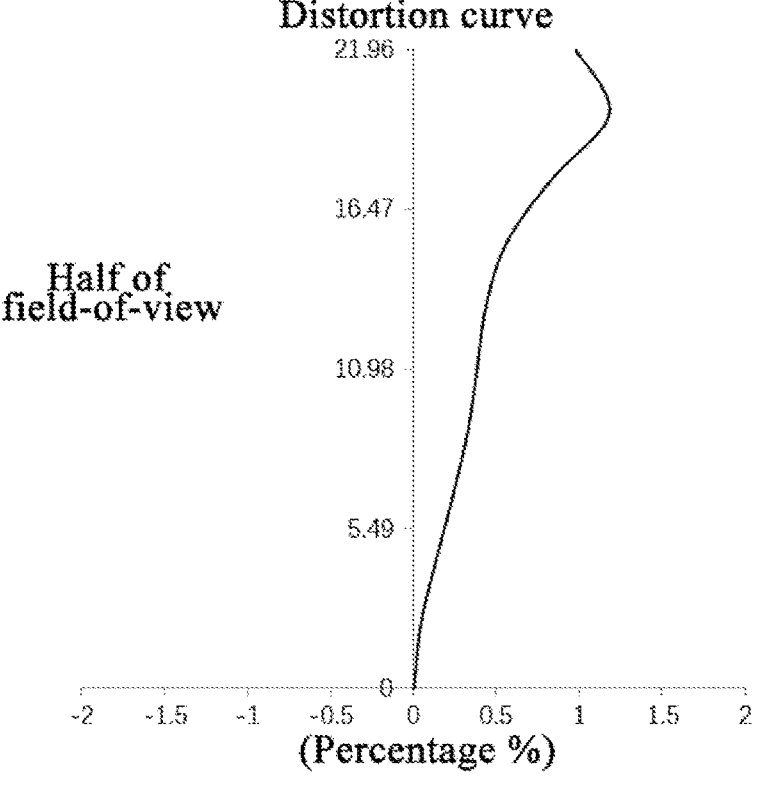
Figure 22:
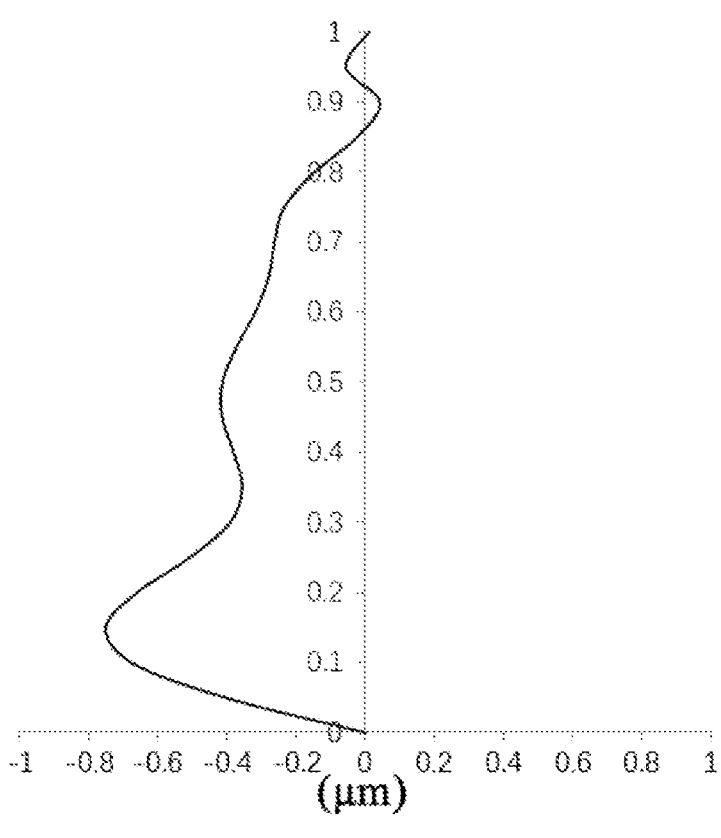

FIG. 19 illustrates a longitudinal aberration curve of the optical lens assembly in Example 3, representing deviations of focal points of light of different wavelengths converged after passing through the optical lens assembly. FIG. 20 illustrates an astigmatic curve of the optical lens assembly in Example 3, representing a curvature of a tangential image plane and a curvature of a sagittal image plane. FIG. 21 illustrates a distortion curve of the optical lens assembly in Example 3, representing amounts of distortion corresponding to different fields-of-view. FIG. 22 illustrates a lateral color curve of the optical lens assembly in Example 3, representing deviations of different image heights on an image plane after light passes through the optical lens assembly.

It can be seen from FIGS. 19-22 that the optical lens assembly given in Example 3 can achieve a good imaging quality.

In summary, Examples 1-3 respectively satisfy the relationships shown in Table 10.

TABLE 10

| conditional expression | example | | | | | | | | |
|---|---|---|---|---|---|---|---|---|---|
| | 1-1 | 1-2 | 1-3 | 2-1 | 2-2 | 2-3 | 3-1 | 3-2 | 3-3 |
| \|f5 − f4\|/(D4m − d4s) | 7.93 | 6.99 | 7.86 | 16.38 | 17.14 | 13.95 | 23.34 | 12.32 | 11.87 |
| f*f/(d0m*TD) | 2.12 | 2.06 | 2.12 | 1.55 | 1.47 | 1.40 | 1.77 | 1.77 | 1.77 |
| d4s/d3m > \|d2s/d3s\| | 0.36 | 0.38 | 0.21 | 0.56 | 0.61 | 0.50 | 0.40 | 0.45 | 0.31 |
| f/(D0m − D0s) | 7.94 | 7.94 | 7.94 | 3.78 | 3.78 | 2.97 | 5.95 | 5.94 | 5.94 |
| f/(d5s − D5s) | 4.78 | 4.38 | 4.65 | 4.56 | 4.56 | 3.71 | 6.98 | 7.24 | 7.24 |
| (R4 − R1)/(EP12 − CT2) | 6.03 | 6.35 | 10.45 | 3.29 | 4.11 | 6.96 | 24.17 | 24.42 | 46.25 |
| EP45/CT5*\|f5 + f6\|/R10 | −0.01 | −0.01 | −0.01 | −0.43 | −0.41 | −0.41 | −0.45 | −0.32 | −0.37 |
| EP45/TD*(R10 − R9)/f | −0.73 | −0.74 | −0.74 | −1.10 | −1.03 | −1.15 | −0.07 | −0.06 | −0.07 |
| f1234/(EP01 + EP12 + EP23 + EP34) | 3.53 | 2.93 | 4.21 | 3.07 | 3.07 | 3.38 | 3.22 | 2.85 | 3.57 |
| R1/(CP1 + EP01) | 1.94 | 1.17 | 1.53 | 1.74 | 1.60 | 1.39 | 1.96 | 1.64 | 1.78 |
| (d0s − d1s)/CT1*Fno | 5.56 | 4.51 | 10.25 | 5.38 | 7.81 | 6.81 | 8.51 | 10.40 | 11.16 |
| f/(L*tan(FOV/2)) | 3.59 | 3.00 | 3.38 | 2.88 | 2.88 | 2.68 | 3.40 | 2.86 | 3.13 |
| D5m/CT6 | 23.15 | 23.85 | 23.15 | 20.30 | 20.30 | 21.39 | 5.79 | 5.79 | 5.79 |
| d0m/TD | 1.25 | 1.29 | 1.25 | 1.35 | 1.42 | 1.49 | 1.07 | 1.07 | 1.07 |
| (d0m − d4s)/(Tr8r12*tan(FOV/2)) | 4.00 | 4.13 | 3.75 | 3.30 | 3.55 | 4.10 | 3.17 | 3.04 | 3.30 |
| d1s/CT1*f1/R1 | 5.38 | 7.12 | 4.95 | 5.39 | 5.05 | 5.17 | 4.64 | 4.63 | 4.80 |
| f/\|d0m − D0s\| | 16.09 | 36.92 | 31.85 | 7.26 | 4.40 | 4.07 | 555.71 | 15.61 | 32.69 |
| f2/(EP12 − EP23) | −34.04 | −18.37 | −28.30 | −17.89 | −27.69 | −95.31 | −19.27 | −28.76 | −97.94 |
| T56/EP45*f/R10 | −11.69 | −11.78 | −11.78 | −3.92 | −3.69 | −4.11 | −20.15 | −18.60 | −21.72 |
| EP12/R4 + EP34/R7 | −0.14 | −0.14 | −0.13 | −0.01 | −0.02 | −0.01 | −0.07 | −0.07 | −0.05 |
| EP12 − T12 | 0.24 | 0.21 | 0.01 | 0.38 | 0.29 | 0.14 | 0.53 | 0.52 | 0.34 |
| EP45 − T45 | 0.02 | 0.03 | 0.03 | 0.20 | 0.14 | 0.25 | 0.45 | 0.35 | 0.55 |
| f/(d1m*tan(FOV)) | 2.99 | 2.26 | 2.28 | 2.18 | 2.32 | 1.50 | 3.52 | 3.53 | 2.70 |
| f2/(d4s2 − d2s2) | 18.94 | 17.50 | 28.26 | 8.25 | 7.33 | 9.52 | 17.79 | 14.56 | 22.66 |

It should be noted that, in Table 10, 1-1 represents that the optical lens assembly in Example 1 is in the first state, 1-2 represents that the optical lens assembly in Example 1 is in the second state, 1-3 represents that the optical lens assembly in Example 1 is in the third state, 2-1 represents that the optical lens assembly in Example 2 is in the first state, 2-2 represents that the optical lens assembly in Example 2 is in the second state, 2-3 represents that the optical lens assembly in Example 2 is in the third state, 3-1 represents that the optical lens assembly in Example 3 is in the first state, 3-2 represents that the optical lens assembly in Example 3 is in the second state, and 3-3 represents that the optical lens assembly in Example 3 is in the third state.

Embodiments of the present disclosure further provides an imaging apparatus, of which the electronic photosensitive element may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical lens assembly described above.

Clearly, the embodiments described above are only part of the embodiments of the present disclosure, but not all of the embodiments. Based on the embodiments in the present disclosure, all other embodiments obtained by those of ordinary skill in the art without making creative efforts shall fall within the scope of protection of the present disclosure.

It should be noted that the terms used herein are for the purpose of describing specific implementations only, rather than limiting the exemplary implementations according to the present disclosure. As used herein, the singular form is intended to include the plural form as well, unless the context clearly indicates otherwise. Moreover, it should be understood that the terms "includes" and/or "comprises," when used in this specification, specify the presence of the features, steps, operations, devices, components and/or combinations thereof.

It should be noted that the terms "first" and "second" in the specification and claims of the present disclosure and the accompanying drawings are used to distinguish similar objects, but not necessarily used to describe a specific order or sequential order. It should be understood that the data so used are interchangeable under appropriate circumstances such that the implementations of the present disclosure described herein can be performed in an order other than that illustrated or described herein.

The foregoing is only preferred embodiments of the present disclosure, and is not used to limit the present disclosure. For those skilled in the art, the present disclosure may have various alterations and changes. Any modifications, equivalent substitutions, improvements, etc. made within the spirit and principles of the present disclosure shall fall within the scope of protection of the present disclosure.

What is claimed is:

1. An optical lens assembly, comprising a lens barrel, and a first lens, a second lens, a third lens, a fourth lens, a fifth lens and a sixth lens that are sequentially disposed in the lens barrel from an object side to an image side;

wherein a refractive power of the fifth lens and a refractive power of the sixth lens are positive-negative opposite, and an image-side surface of the fifth lens is a convex surface;

the lens barrel further comprises a plurality of spacers, and the plurality of spacers at least comprise a first spacer, a second spacer, and a third spacer, a fourth spacer and a fifth spacer, the first spacer being disposed between the first lens and the second lens and being in contact with an image-side surface of the first lens, the second spacer being disposed between the second lens and the third lens and being in contact with an image-side surface of the second lens, the third spacer being disposed between the third lens and the fourth lens and being in contact with an image-side surface of the third lens, the fourth spacer being disposed between the fourth lens and the fifth lens and being in contact with an image-side surface of the fourth lens, and the fifth spacer being disposed between the fifth lens and the sixth lens and being in contact with the image-side surface of the fifth lens and an image-side surface of the sixth lens respectively;

an axial distance EP45 from an image-side surface of the fourth spacer to an object-side surface of the fifth spacer, a center thickness CT5 of the fifth lens, an effective focal length f5 of the fifth lens, an effective focal length f6 of the sixth lens, and a radius of curvature R10 of the image-side surface of the fifth lens satisfy: $-0.5<EP45/CT5*|f5+f6|/R10<0$;

an axial distance EP12 from an image-side surface of the first spacer to an object-side surface of the second spacer, and an axial distance EP23 from an image-side surface of the second spacer to an object-side surface of the third spacer satisfy: $EP12>EP23$; and an effective focal length f2 of the second lens satisfies: $-100<f2/(EP12-EP23)<-10$.

2. The optical lens assembly according to claim 1, wherein an effective focal length f of the optical lens assembly, an inner diameter d0m of an image-side surface of the lens barrel, and an axial distance TD from an object-side surface of the first lens to the image-side surface of the sixth lens satisfy: $1<f*f/(d0m*TD)<2.5$.

3. The optical lens assembly according to claim 1, wherein a radius of curvature R4 of the image-side surface of the second lens, a radius of curvature R1 of an object-side surface of the first lens, and a center thickness CT2 of the second lens satisfy: $3<(R4-R1)/(EP12-CT2)<50$.

4. The optical lens assembly according to claim 1, wherein the axial distance EP45 from the image-side surface of the fourth spacer to the object-side surface of the fifth spacer, an axial distance TD from an object-side surface of the first lens to the image-side surface of the sixth lens, the radius of curvature R10 of the image-side surface of the fifth lens, a radius of curvature R9 of an object-side surface of the fifth lens, and an effective focal length f of the optical lens assembly satisfy: $-2<EP45/TD*(R10-R9)/f<0$.

5. The optical lens assembly according to claim 1, wherein a combined focal length f1234 of the first lens, the second lens, the third lens, and the fourth lens, an axial distance EP01 from an object-side surface of the lens barrel to an object-side surface of the first spacer, and an axial distance EP34 from an image-side surface of the third spacer to an object-side surface of the fourth spacer satisfy:

$$2 < f1234/(EP01 + EP12 + EP23 + EP34) < 5.$$

6. The optical lens assembly according to claim 1, wherein a radius of curvature R1 of an object-side surface of the first lens, a maximal thickness CP1 of the first spacer, and an axial distance EP01 from an object-side surface of the lens barrel to an object-side surface of the first spacer satisfy: $1<R1/(CP1+EP01)<2$.

7. The optical lens assembly according to claim 1, wherein an inner diameter dos of an object-side surface of the lens barrel, an inner diameter d1s of an object-side surface of the first spacer, a center thickness CT1 of the first lens, and an F-number Fno of the optical lens assembly satisfy: 4<(d0s−d1s)/CT1*Fno<12.

8. The optical lens assembly according to claim 1, wherein an inner diameter d1s of an object-side surface of the first spacer, a center thickness CT1 of the first lens, an effective focal length f1 of the first lens, and a radius of curvature R1 of an object-side surface of the first lens satisfy: 4<d1s/CT1*f1/R1<8.

9. The optical lens assembly according to claim 1, wherein an effective focal length f of the optical lens assembly, an inner diameter d0m of an image-side surface of the lens barrel, and an outer diameter D0s of an object-side surface of the lens barrel satisfy: f/|d0m−D0s|>4.

10. The optical lens assembly according to claim 1, wherein an object-side surface of the fourth lens is an concave surface, and the optical lens assembly satisfy: |R4|<|R7|, EP12/R4+EP34/R7>−0.5, where EP34 is an axial distance from an image-side surface of the third spacer to an object-side surface of the fourth spacer, R4 is a radius of curvature of the image-side surface of the second lens, R7 is a radius of curvature of an object-side surface of the fourth lens.

11. The optical lens assembly according to claim 1, wherein refractive indexes of the second and fifth lenses in the first lens to the sixth lens are largest, and the optical lens assembly satisfy: EP12>T12 and EP45>T45, where T12 is an axial spacing distance between the first lens and the second lens, and T45 is an axial spacing distance between the fourth lens and the fifth lens.

12. The optical lens assembly according to claim 1, wherein an effective focal length f of the optical lens assembly, an inner diameter dim of an image-side surface of the first spacer, and a maximal field-of-view FOV of the optical lens assembly satisfy: 1<f/(d1m*tan (FOV))<5.

13. The optical lens assembly according to claim 1, wherein, an effective focal length f of the optical lens assembly, an outer diameter D0m of an image-side surface of the lens barrel, and an outer diameter D0s of an object-side surface of the lens barrel satisfy: 2<f/(D0m−D0s)<9; and an axial spacing distance T56 from the fifth lens to the sixth lens, an axial distance EP45 from the image-side surface of the fourth spacer to the object-side surface of the fifth spacer, the effective focal length f of the optical lens assembly, and a radius of curvature R10 of the image-side surface of the fifth lens satisfy:

$$-25 < T56/EP45^* f/R10 < -3.$$

14. The optical lens assembly according to claim 1, wherein the effective focal length f5 of the fifth lens, an effective focal length f4 of the fourth lens, an outer diameter D4m of the image-side surface of the fourth lens, and an inner diameter d4s of an object-side surface of the fourth spacer satisfy: 5<|f5−f4|/(D4m−d4s)<25.

15. The optical lens assembly according to claim 1, wherein an effective focal length f of the optical lens assembly, an inner diameter d4s of an object-side surface of the fourth spacer, and an inner diameter d2s of an object-side surface of the second spacer satisfy: d4s>d2s, and 5<f²/(d4s²−d2s²)<30.

16. The optical lens assembly according to claim 1, wherein an inner diameter d4s of an object-side surface of the fourth spacer, an inner diameter d3m of an image-side surface of the third spacer, an inner diameter d2s of an object-side surface of the second spacer, and an inner diameter d3s of an object-side surface of the third spacer satisfy: d4s/d3m>|d2s/d3s|.

17. The optical lens assembly according to claim 1, wherein an effective focal length f of the optical lens assembly, an inner diameter d5s of the object-side surface of the fifth spacer, and an outer diameter D5s of the object-side surface of the fifth spacer satisfy: 3<f/(d5s−D5s)<8;

an outer diameter D5m of an image-side surface of the fifth spacer, and a center thickness CT6 of the sixth lens satisfy: 5<D5m/CT6<25; or an outer diameter D0m of an image-side surface of the lens barrel and an axial distance TD from an object-side surface of the first lens to the image-side surface of the sixth lens satisfy: 1<d0m/TD<1.5.

18. The optical lens assembly according to claim 1, wherein an effective focal length f of the optical lens assembly, a maximal height L of the lens barrel, and a maximal field-of-view FOV of the optical lens assembly satisfy: 2<f/(L*tan (FOV/2))<5; or an inner diameter d0m of an image-side surface of the lens barrel, an inner diameter d4s of an object-side surface of the fourth spacer, an axial distance Tr8r12 from the image-side surface of the fourth lens to the image-side surface of the sixth lens, and a maximal field-of-view FOV of the optical lens assembly satisfy: 3< (d0m−d4s)/(Tr8r12*tan (FOV/2))<5.

* * * * *